(12) United States Patent
Zhu et al.

(10) Patent No.: US 12,408,243 B2
(45) Date of Patent: *Sep. 2, 2025

(54) LED LIGHTING SYSTEMS WITH TRIAC DIMMERS AND METHODS THEREOF

(71) Applicant: ON-BRIGHT ELECTRONICS (SHANGHAI) CO., LTD., Shanghai (CN)

(72) Inventors: Liqiang Zhu, Shanghai (CN); Jun Zhou, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,816

(22) Filed: Feb. 1, 2024

(65) Prior Publication Data
US 2024/0334563 A1    Oct. 3, 2024

Related U.S. Application Data

(60) Continuation of application No. 18/103,971, filed on Jan. 31, 2023, now Pat. No. 11,937,350, which is a
(Continued)

(30) Foreign Application Priority Data

Dec. 28, 2017    (CN) .......................... 201711464007.9

(51) Int. Cl.
*H05B 45/10*    (2020.01)
*H05B 45/31*    (2020.01)
(Continued)

(52) U.S. Cl.
CPC ............. *H05B 45/10* (2020.01); *H05B 45/31* (2020.01); *H05B 45/345* (2020.01);
(Continued)

(58) Field of Classification Search
CPC ...... H05B 45/10; H05B 45/395; H05B 45/31; H05B 45/50; H05B 45/345; H05B 45/59
See application file for complete search history.

(56) References Cited

U.S. PATENT DOCUMENTS

| | | | |
|---|---|---|---|
| 3,803,452 A | 4/1974 | Goldschmied | |
| 3,899,713 A | 8/1975 | Barkan et al. | |
| | | (Continued) | |

FOREIGN PATENT DOCUMENTS

| | | | |
|---|---|---|---|
| CN | 1448005 A | 10/2003 | |
| CN | 101040570 A | 9/2007 | |
| | (Continued) | | |

OTHER PUBLICATIONS

United States Patent and Trademark Office, Notice of Allowance mailed Aug. 3, 2023, in U.S. Appl. No. 18/081,528.
(Continued)

*Primary Examiner* — Henry Luong
(74) *Attorney, Agent, or Firm* — Faegre Drinker Biddle & Reath LLP

(57) ABSTRACT

System and method for controlling one or more light emitting diodes. For example, the system for controlling one or more light emitting diodes includes a current regulation circuit coupled to a cathode of one or more light emitting diodes. The one or more light emitting diodes include the cathode and an anode configured to receive a rectified voltage. Additionally, the system includes a control circuit coupled to the cathode of the one or more light emitting diodes. The control circuit is configured to receive a first voltage from the cathode of the one or more light emitting diodes, compare a second voltage and a threshold voltage, and generate a control signal based at least in part on the second voltage and the threshold voltage. The second voltage indicates a magnitude of the first voltage.

10 Claims, 5 Drawing Sheets

Related U.S. Application Data continuation of application No. 17/023,632, filed on Sep. 17, 2020, now Pat. No. 11,638,335, which is a division of application No. 16/226,424, filed on Dec. 19, 2018, now Pat. No. 10,827,588.

(51) Int. Cl.
*H05B 45/345* (2020.01)
*H05B 45/395* (2020.01)
*H05B 45/50* (2022.01)
*H05B 45/59* (2022.01)

(52) U.S. Cl.
CPC ........... *H05B 45/395* (2020.01); *H05B 45/50* (2020.01); *H05B 45/59* (2022.01)

(56) References Cited

U.S. PATENT DOCUMENTS

| | | |
|---|---|---|
| 4,253,045 A | 2/1981 | Weber |
| 5,144,205 A | 9/1992 | Motto et al. |
| 5,249,298 A | 9/1993 | Bolan et al. |
| 5,504,398 A | 4/1996 | Rothenbuhler |
| 5,949,197 A | 9/1999 | Kastner |
| 6,196,208 B1 | 3/2001 | Masters |
| 6,218,788 B1 | 4/2001 | Chen et al. |
| 6,229,271 B1 | 5/2001 | Liu |
| 6,278,245 B1 | 8/2001 | Li et al. |
| 7,038,399 B2 | 5/2006 | Lys et al. |
| 7,649,327 B2 | 1/2010 | Peng |
| 7,759,881 B1 | 7/2010 | Melanson |
| 7,825,715 B1 | 11/2010 | Greenberg |
| 7,880,400 B2 | 2/2011 | Zhou et al. |
| 7,944,153 B2 | 5/2011 | Greenfeld |
| 8,018,171 B1 | 9/2011 | Melanson et al. |
| 8,098,021 B2 | 1/2012 | Wang et al. |
| 8,129,976 B2 | 3/2012 | Blakeley |
| 8,134,302 B2 | 3/2012 | Yang et al. |
| 8,278,832 B2 | 10/2012 | Hung et al. |
| 8,373,313 B2 | 2/2013 | Garcia et al. |
| 8,378,583 B2 | 2/2013 | Hying et al. |
| 8,378,588 B2 | 2/2013 | Kuo et al. |
| 8,378,589 B2 | 2/2013 | Kuo et al. |
| 8,415,901 B2 | 4/2013 | Recker et al. |
| 8,432,438 B2 | 4/2013 | Ryan et al. |
| 8,497,637 B2 | 7/2013 | Liu |
| 8,558,477 B2 | 10/2013 | Bordin et al. |
| 8,569,956 B2 | 10/2013 | Shteynberg et al. |
| 8,644,041 B2 | 2/2014 | Pansier |
| 8,653,750 B2 | 2/2014 | Deurenberg et al. |
| 8,686,668 B2 | 4/2014 | Grotkowski et al. |
| 8,698,407 B1 | 4/2014 | Chen et al. |
| 8,698,419 B2 | 4/2014 | Yan et al. |
| 8,716,882 B2 | 5/2014 | Pettler et al. |
| 8,742,674 B2 | 6/2014 | Shteynberg et al. |
| 8,829,819 B1 | 9/2014 | Angeles et al. |
| 8,890,440 B2 | 11/2014 | Yan et al. |
| 8,896,288 B2 | 11/2014 | Choi et al. |
| 8,941,323 B1 | 1/2015 | Wu et al. |
| 8,941,324 B2 | 1/2015 | Zhou et al. |
| 8,941,328 B2 | 1/2015 | Wu et al. |
| 8,947,010 B2 | 2/2015 | Barrow et al. |
| 9,030,122 B2 | 5/2015 | Yan et al. |
| 9,084,316 B2 | 7/2015 | Melanson et al. |
| 9,131,581 B1 | 9/2015 | Hsia et al. |
| 9,148,050 B2 | 9/2015 | Chiang |
| 9,167,638 B2 | 10/2015 | Le |
| 9,173,258 B2 | 10/2015 | Ekbote |
| 9,207,265 B1 | 12/2015 | Grisamore et al. |
| 9,220,133 B2 | 12/2015 | Salvestrini et al. |
| 9,220,136 B2 | 12/2015 | Zhang et al. |
| 9,247,623 B2 | 1/2016 | Recker et al. |
| 9,247,625 B2 | 1/2016 | Recker et al. |
| 9,301,349 B2 | 3/2016 | Zhu et al. |
| 9,332,609 B1 | 5/2016 | Rhodes et al. |
| 9,402,293 B2 | 7/2016 | Vaughan et al. |
| 9,408,269 B2 | 8/2016 | Zhu et al. |
| 9,414,455 B2 | 8/2016 | Zhou et al. |
| 9,467,137 B2 | 10/2016 | Eum et al. |
| 9,480,118 B2 | 10/2016 | Liao et al. |
| 9,485,833 B2 | 11/2016 | Datta et al. |
| 9,554,432 B2 | 1/2017 | Zhu et al. |
| 9,572,224 B2 | 2/2017 | Gaknoki et al. |
| 9,585,222 B2 | 2/2017 | Zhu et al. |
| 9,655,188 B1 | 5/2017 | Lewis et al. |
| 9,661,702 B2 | 5/2017 | Mednik et al. |
| 9,723,676 B2 | 8/2017 | Ganick et al. |
| 9,750,107 B2 | 8/2017 | Zhu et al. |
| 9,781,786 B2 | 10/2017 | Ho et al. |
| 9,820,344 B1 | 11/2017 | Papanicolaou |
| 9,883,561 B1 | 1/2018 | Liang et al. |
| 9,883,562 B2 | 1/2018 | Zhu et al. |
| 9,961,734 B2 | 5/2018 | Zhu et al. |
| 10,054,271 B2 | 8/2018 | Xiong et al. |
| 10,143,051 B2 | 11/2018 | Liu et al. |
| 10,153,684 B2 | 12/2018 | Liu et al. |
| 10,194,500 B2 | 1/2019 | Zhu et al. |
| 10,264,642 B2 | 4/2019 | Liang et al. |
| 10,292,217 B2 | 5/2019 | Zhu et al. |
| 10,299,328 B2 | 5/2019 | Fu et al. |
| 10,334,677 B2 | 6/2019 | Zhu et al. |
| 10,342,087 B2 | 7/2019 | Zhu et al. |
| 10,362,643 B2 | 7/2019 | Kim et al. |
| 10,375,785 B2 | 8/2019 | Li et al. |
| 10,383,187 B2 | 8/2019 | Liao et al. |
| 10,405,392 B1 | 9/2019 | Shi et al. |
| 10,447,171 B2 | 10/2019 | Newman et al. |
| 10,448,469 B2 | 10/2019 | Zhu et al. |
| 10,448,470 B2 | 10/2019 | Zhu et al. |
| 10,455,657 B2 | 10/2019 | Zhu et al. |
| 10,499,467 B2 | 12/2019 | Wang |
| 10,512,131 B2 | 12/2019 | Zhu et al. |
| 10,530,268 B2 | 1/2020 | Newman et al. |
| 10,531,534 B1 | 1/2020 | Zhou |
| 10,568,185 B1 | 2/2020 | Ostrovsky et al. |
| 10,616,975 B2 | 4/2020 | Gotou et al. |
| 10,687,397 B2 | 6/2020 | Zhu et al. |
| 10,785,837 B2 | 9/2020 | Li et al. |
| 10,827,588 B2 | 11/2020 | Zhu et al. |
| 10,973,095 B2 | 4/2021 | Zhu et al. |
| 10,999,903 B2 | 5/2021 | Li et al. |
| 10,999,904 B2 | 5/2021 | Zhu et al. |
| 11,026,304 B2 | 6/2021 | Li et al. |
| 11,183,996 B2 | 11/2021 | Zhu et al. |
| 11,201,612 B2 | 12/2021 | Zhu et al. |
| 11,206,015 B2 | 12/2021 | Zhu et al. |
| 11,212,885 B2 | 12/2021 | Liao et al. |
| 11,224,105 B2 | 1/2022 | Yang et al. |
| 11,252,799 B2 | 2/2022 | Li et al. |
| 11,297,704 B2 | 4/2022 | Zhu et al. |
| 11,405,992 B2 | 8/2022 | Li et al. |
| 11,564,299 B2 | 1/2023 | Li et al. |
| 11,570,859 B2 | 1/2023 | Zhu et al. |
| 11,638,335 B2 | 4/2023 | Zhu et al. |
| 11,678,417 B2 | 6/2023 | Yang et al. |
| 11,695,401 B2 | 7/2023 | Zhu et al. |
| 11,723,128 B2 | 8/2023 | Li et al. |
| 11,743,984 B2 | 8/2023 | Li et al. |
| 11,784,638 B2 | 10/2023 | Zhu et al. |
| 11,792,901 B2 | 10/2023 | Zhu et al. |
| 11,856,670 B2 | 12/2023 | Li et al. |
| 11,937,350 B2 | 3/2024 | Zhu et al. |
| 12,009,825 B2 | 6/2024 | Zhu et al. |
| 12,089,302 B2 | 9/2024 | Li et al. |
| 12,193,124 B2 | 1/2025 | Zhu et al. |
| 2006/0022648 A1 | 2/2006 | Ben-Yaakov et al. |
| 2007/0182338 A1 | 8/2007 | Shteynberg et al. |
| 2007/0182699 A1 | 8/2007 | Ha et al. |
| 2007/0267978 A1 | 11/2007 | Shteynberg et al. |
| 2008/0224629 A1 | 9/2008 | Melanson |
| 2008/0224633 A1 | 9/2008 | Melanson et al. |
| 2008/0278092 A1 | 11/2008 | Lys et al. |
| 2009/0021469 A1 | 1/2009 | Yeo et al. |
| 2009/0085494 A1 | 4/2009 | Summerland |

(56) References Cited

U.S. PATENT DOCUMENTS

| | | |
|---|---|---|
| 2009/0251059 A1 | 10/2009 | Veltman |
| 2010/0141153 A1 | 6/2010 | Recker et al. |
| 2010/0148691 A1 | 6/2010 | Kuo et al. |
| 2010/0156319 A1 | 6/2010 | Melanson |
| 2010/0164406 A1 | 7/2010 | Kost et al. |
| 2010/0176733 A1 | 7/2010 | King |
| 2010/0207536 A1 | 8/2010 | Burdalski et al. |
| 2010/0213859 A1 | 8/2010 | Shteynberg et al. |
| 2010/0219766 A1 | 9/2010 | Kuo et al. |
| 2010/0231136 A1 | 9/2010 | Reisenauer et al. |
| 2011/0012530 A1 | 1/2011 | Zheng et al. |
| 2011/0037399 A1 | 2/2011 | Hung et al. |
| 2011/0074302 A1 | 3/2011 | Draper et al. |
| 2011/0080110 A1 | 4/2011 | Nuhfer et al. |
| 2011/0080111 A1 | 4/2011 | Nuhfer et al. |
| 2011/0080112 A1 | 4/2011 | Shearer et al. |
| 2011/0101867 A1 | 5/2011 | Wang et al. |
| 2011/0121744 A1 | 5/2011 | Salvestrini et al. |
| 2011/0121754 A1 | 5/2011 | Shteynberg et al. |
| 2011/0133662 A1 | 6/2011 | Yan et al. |
| 2011/0140620 A1 | 6/2011 | Lin et al. |
| 2011/0140621 A1 | 6/2011 | Yi et al. |
| 2011/0187283 A1 | 8/2011 | Wang et al. |
| 2011/0227490 A1 | 9/2011 | Huynh |
| 2011/0260619 A1 | 10/2011 | Sadwick et al. |
| 2011/0285301 A1 | 11/2011 | Kuang et al. |
| 2011/0291583 A1 | 12/2011 | Shen |
| 2011/0309759 A1 | 12/2011 | Shteynberg et al. |
| 2012/0001548 A1 | 1/2012 | Recker et al. |
| 2012/0032604 A1 | 2/2012 | Hontele |
| 2012/0056553 A1 | 3/2012 | Koolen et al. |
| 2012/0069616 A1 | 3/2012 | Kitamura et al. |
| 2012/0080944 A1 | 4/2012 | Recker et al. |
| 2012/0081009 A1 | 4/2012 | Shteynberg et al. |
| 2012/0081032 A1 | 4/2012 | Huang |
| 2012/0081035 A1 | 4/2012 | McCune, Jr. |
| 2012/0146526 A1 | 6/2012 | Lam et al. |
| 2012/0181944 A1 | 7/2012 | Jacobs et al. |
| 2012/0181946 A1 | 7/2012 | Melanson |
| 2012/0187857 A1 | 7/2012 | Ulmann et al. |
| 2012/0242237 A1 | 9/2012 | Chen et al. |
| 2012/0242238 A1 | 9/2012 | Chen et al. |
| 2012/0262093 A1 | 10/2012 | Recker et al. |
| 2012/0268031 A1 | 10/2012 | Zhou et al. |
| 2012/0274227 A1 | 11/2012 | Zheng et al. |
| 2012/0286663 A1 | 11/2012 | Puvanakijjakorn et al. |
| 2012/0286679 A1 | 11/2012 | Liu |
| 2012/0299500 A1 | 11/2012 | Sadwick et al. |
| 2012/0299501 A1 | 11/2012 | Kost et al. |
| 2012/0299511 A1 | 11/2012 | Montante et al. |
| 2012/0319604 A1 | 12/2012 | Walters |
| 2012/0326616 A1 | 12/2012 | Sumitani et al. |
| 2013/0009561 A1 | 1/2013 | Briggs |
| 2013/0020965 A1 | 1/2013 | Kang et al. |
| 2013/0026942 A1 | 1/2013 | Ryan et al. |
| 2013/0026945 A1 | 1/2013 | Ganick et al. |
| 2013/0027528 A1 | 1/2013 | Staats et al. |
| 2013/0034172 A1 | 2/2013 | Pettler et al. |
| 2013/0043726 A1 | 2/2013 | Krishnamoorthy et al. |
| 2013/0049631 A1 | 2/2013 | Riesebosch |
| 2013/0063047 A1 | 3/2013 | Veskovic |
| 2013/0134904 A1 | 5/2013 | Yau et al. |
| 2013/0141001 A1 | 6/2013 | Datta et al. |
| 2013/0154487 A1 | 6/2013 | Kuang et al. |
| 2013/0162155 A1 | 6/2013 | Matsuda et al. |
| 2013/0162158 A1 | 6/2013 | Pollischansky |
| 2013/0169177 A1 | 7/2013 | Liao et al. |
| 2013/0175931 A1 | 7/2013 | Sadwick |
| 2013/0181630 A1 | 7/2013 | Taipale et al. |
| 2013/0187568 A1 | 7/2013 | Jelaca et al. |
| 2013/0193866 A1 | 8/2013 | Datta et al. |
| 2013/0193879 A1 | 8/2013 | Sadwick et al. |
| 2013/0194848 A1 | 8/2013 | Bernardinis et al. |
| 2013/0215655 A1 | 8/2013 | Yang et al. |
| 2013/0223107 A1 | 8/2013 | Zhang et al. |
| 2013/0229121 A1 | 9/2013 | Otake et al. |
| 2013/0241427 A1 | 9/2013 | Kesterson et al. |
| 2013/0241428 A1 | 9/2013 | Takeda |
| 2013/0241441 A1 | 9/2013 | Myers et al. |
| 2013/0242622 A1 | 9/2013 | Peng et al. |
| 2013/0249431 A1 | 9/2013 | Shteynberg et al. |
| 2013/0278159 A1 | 10/2013 | Del et al. |
| 2013/0307430 A1 | 11/2013 | Blom |
| 2013/0307431 A1 | 11/2013 | Zhu et al. |
| 2013/0307434 A1 | 11/2013 | Zhang et al. |
| 2013/0342127 A1 | 12/2013 | Pan et al. |
| 2013/0343090 A1 | 12/2013 | Eom et al. |
| 2014/0009082 A1 | 1/2014 | King et al. |
| 2014/0029315 A1 | 1/2014 | Zhang et al. |
| 2014/0049177 A1 | 2/2014 | Kulczycki et al. |
| 2014/0063857 A1 | 3/2014 | Peng et al. |
| 2014/0078790 A1 | 3/2014 | Lin et al. |
| 2014/0103829 A1 | 4/2014 | Kang |
| 2014/0132172 A1 | 5/2014 | Zhu et al. |
| 2014/0160809 A1 | 6/2014 | Lin et al. |
| 2014/0176016 A1 | 6/2014 | Li et al. |
| 2014/0177280 A1 | 6/2014 | Yang et al. |
| 2014/0197760 A1 | 7/2014 | Radermacher |
| 2014/0265898 A1 | 9/2014 | Del et al. |
| 2014/0265907 A1 | 9/2014 | Su et al. |
| 2014/0265935 A1 | 9/2014 | Sadwick et al. |
| 2014/0268935 A1 | 9/2014 | Chiang |
| 2014/0300274 A1 | 10/2014 | Acatrinei |
| 2014/0320031 A1* | 10/2014 | Wu ............... H05B 45/397 315/193 |
| 2014/0333228 A1 | 11/2014 | Angeles et al. |
| 2014/0346973 A1 | 11/2014 | Zhu et al. |
| 2014/0354157 A1 | 12/2014 | Morales |
| 2014/0354165 A1 | 12/2014 | Malyna et al. |
| 2014/0354170 A1 | 12/2014 | Gredler et al. |
| 2015/0015159 A1 | 1/2015 | Wang et al. |
| 2015/0035450 A1 | 2/2015 | Werner |
| 2015/0048757 A1 | 2/2015 | Boonen et al. |
| 2015/0062981 A1 | 3/2015 | Fang et al. |
| 2015/0077009 A1 | 3/2015 | Kunimatsu |
| 2015/0091470 A1 | 4/2015 | Zhou et al. |
| 2015/0137704 A1 | 5/2015 | Angeles et al. |
| 2015/0173140 A1 | 6/2015 | Wu et al. |
| 2015/0312978 A1 | 10/2015 | Vaughan et al. |
| 2015/0312982 A1 | 10/2015 | Melanson |
| 2015/0312988 A1 | 10/2015 | Liao et al. |
| 2015/0318789 A1 | 11/2015 | Yang et al. |
| 2015/0333764 A1 | 11/2015 | Pastore et al. |
| 2015/0357910 A1 | 12/2015 | Murakami et al. |
| 2015/0359054 A1 | 12/2015 | Lin et al. |
| 2015/0366010 A1 | 12/2015 | Mao et al. |
| 2015/0382424 A1 | 12/2015 | Knapp et al. |
| 2016/0014861 A1 | 1/2016 | Zhu et al. |
| 2016/0014865 A1 | 1/2016 | Zhu et al. |
| 2016/0037604 A1 | 2/2016 | Zhu et al. |
| 2016/0113077 A1 | 4/2016 | Akiyama |
| 2016/0119998 A1 | 4/2016 | Linnartz et al. |
| 2016/0128142 A1 | 5/2016 | Arulandu et al. |
| 2016/0134187 A1 | 5/2016 | Pregitzer et al. |
| 2016/0277411 A1 | 9/2016 | Dani et al. |
| 2016/0286617 A1 | 9/2016 | Takahashi et al. |
| 2016/0323957 A1 | 11/2016 | Hu et al. |
| 2016/0338163 A1 | 11/2016 | Zhu et al. |
| 2017/0006684 A1 | 1/2017 | Tu et al. |
| 2017/0027029 A1 | 1/2017 | Hu et al. |
| 2017/0055323 A1 | 2/2017 | Lim et al. |
| 2017/0064787 A1 | 3/2017 | Liao et al. |
| 2017/0099712 A1 | 4/2017 | Hilgers et al. |
| 2017/0181235 A1 | 6/2017 | Zhu et al. |
| 2017/0196063 A1 | 7/2017 | Zhu et al. |
| 2017/0251532 A1 | 8/2017 | Wang et al. |
| 2017/0311409 A1 | 10/2017 | Zhu et al. |
| 2017/0354008 A1 | 12/2017 | Eum et al. |
| 2017/0359880 A1 | 12/2017 | Zhu et al. |
| 2018/0035507 A1 | 2/2018 | Kumada et al. |
| 2018/0103520 A1 | 4/2018 | Zhu et al. |
| 2018/0110104 A1 | 4/2018 | Liang et al. |
| 2018/0115234 A1 | 4/2018 | Liu et al. |
| 2018/0139816 A1 | 5/2018 | Liu et al. |

(56) References Cited

U.S. PATENT DOCUMENTS

| | | | |
|---|---|---|---|
| 2018/0184490 | A1 | 6/2018 | Ido |
| 2018/0263089 | A1 | 9/2018 | Seyler et al. |
| 2018/0288845 | A1 | 10/2018 | Zhu et al. |
| 2018/0310376 | A1 | 10/2018 | Huang et al. |
| 2019/0069364 | A1 | 2/2019 | Zhu et al. |
| 2019/0069366 | A1 | 2/2019 | Liao et al. |
| 2019/0082507 | A1 | 3/2019 | Zhu et al. |
| 2019/0104583 | A1 | 4/2019 | Konishi et al. |
| 2019/0124736 | A1 | 4/2019 | Zhu et al. |
| 2019/0166667 | A1 | 5/2019 | Li et al. |
| 2019/0230755 | A1 | 7/2019 | Zhu et al. |
| 2019/0327810 | A1 | 10/2019 | Zhu et al. |
| 2019/0350055 | A1 | 11/2019 | Wu et al. |
| 2019/0350060 | A1 | 11/2019 | Li et al. |
| 2019/0364628 | A1 | 11/2019 | Chen et al. |
| 2019/0380183 | A1 | 12/2019 | Li et al. |
| 2020/0100340 | A1 | 3/2020 | Zhu et al. |
| 2020/0146121 | A1 | 5/2020 | Zhu et al. |
| 2020/0205263 | A1 | 6/2020 | Zhu et al. |
| 2020/0205264 | A1 | 6/2020 | Zhu et al. |
| 2020/0267817 | A1 | 8/2020 | Yang et al. |
| 2020/0305247 | A1 | 9/2020 | Li et al. |
| 2020/0375001 | A1 | 11/2020 | Jung et al. |
| 2021/0007195 | A1 | 1/2021 | Zhu et al. |
| 2021/0007196 | A1 | 1/2021 | Zhu et al. |
| 2021/0045213 | A1 | 2/2021 | Zhu et al. |
| 2021/0153313 | A1 | 5/2021 | Li et al. |
| 2021/0195709 | A1 | 6/2021 | Li et al. |
| 2021/0204375 | A1 | 7/2021 | Li et al. |
| 2022/0038085 | A1 | 2/2022 | Zhu et al. |
| 2022/0149829 | A1 | 5/2022 | Zhu et al. |
| 2022/0209762 | A1 | 6/2022 | Zhu et al. |
| 2022/0210880 | A1 | 6/2022 | Li et al. |
| 2022/0217824 | A1 | 7/2022 | Zhu et al. |
| 2022/0225480 | A1 | 7/2022 | Li et al. |
| 2022/0225483 | A1 | 7/2022 | Yang et al. |
| 2023/0180360 | A1 | 6/2023 | Zhu et al. |
| 2023/0225028 | A1 | 7/2023 | Li et al. |
| 2024/0008151 | A1 | 1/2024 | Li et al. |
| 2024/0049371 | A1 | 2/2024 | Li et al. |
| 2024/0097665 | A1 | 3/2024 | Zhu et al. |
| 2024/0147591 | A1 | 5/2024 | Zhu et al. |
| 2024/0179817 | A1 | 5/2024 | Li et al. |
| 2025/0071869 | A1 | 2/2025 | Li et al. |

FOREIGN PATENT DOCUMENTS

| | | | |
|---|---|---|---|
| CN | 101657057 | A | 2/2010 |
| CN | 101868090 | A | 10/2010 |
| CN | 101896022 | A | 11/2010 |
| CN | 101917804 | A | 12/2010 |
| CN | 101938865 | A | 1/2011 |
| CN | 101998734 | A | 3/2011 |
| CN | 102014540 | A | 4/2011 |
| CN | 102014551 | A | 4/2011 |
| CN | 102056378 | A | 5/2011 |
| CN | 102209412 | A | 10/2011 |
| CN | 102300375 | A | 12/2011 |
| CN | 102347607 | A | 2/2012 |
| CN | 102387634 | A | 3/2012 |
| CN | 102474953 | A | 5/2012 |
| CN | 102497706 | A | 6/2012 |
| CN | 102612194 | A | 7/2012 |
| CN | 202353859 | U | 7/2012 |
| CN | 102668717 | A | 9/2012 |
| CN | 102695330 | A | 9/2012 |
| CN | 102791056 | A | 11/2012 |
| CN | 102843836 | A | 12/2012 |
| CN | 202632722 | U | 12/2012 |
| CN | 102870497 | A | 1/2013 |
| CN | 102946674 | A | 2/2013 |
| CN | 103004290 | A | 3/2013 |
| CN | 103024994 | A | 4/2013 |
| CN | 103096606 | A | 5/2013 |
| CN | 103108470 | A | 5/2013 |
| CN | 103260302 | A | 8/2013 |
| CN | 103313472 | A | 9/2013 |
| CN | 103369802 | A | 10/2013 |
| CN | 103379712 | A | 10/2013 |
| CN | 103428953 | A | 12/2013 |
| CN | 103458579 | A | 12/2013 |
| CN | 103547014 | A | 1/2014 |
| CN | 103648219 | A | 3/2014 |
| CN | 103716934 | A | 4/2014 |
| CN | 103781229 | A | 5/2014 |
| CN | 103858524 | A | 6/2014 |
| CN | 203675408 | U | 6/2014 |
| CN | 103945614 | A | 7/2014 |
| CN | 103957634 | A | 7/2014 |
| CN | 104066254 | A | 9/2014 |
| CN | 104619077 | A | 5/2015 |
| CN | 204392621 | U | 6/2015 |
| CN | 104768265 | A | 7/2015 |
| CN | 104902653 | A | 9/2015 |
| CN | 105072742 | A | 11/2015 |
| CN | 105246218 | A | 1/2016 |
| CN | 105265019 | A | 1/2016 |
| CN | 105423140 | A | 3/2016 |
| CN | 105591553 | A | 5/2016 |
| CN | 105873269 | A | 8/2016 |
| CN | 105992440 | A | 10/2016 |
| CN | 106105395 | A | 11/2016 |
| CN | 106163009 | A | 11/2016 |
| CN | 205812458 | U | 12/2016 |
| CN | 106332374 | A | 1/2017 |
| CN | 106332390 | A | 1/2017 |
| CN | 106358337 | A | 1/2017 |
| CN | 106413189 | A | 2/2017 |
| CN | 206042434 | U | 3/2017 |
| CN | 106604460 | A | 4/2017 |
| CN | 106793246 | A | 5/2017 |
| CN | 106888524 | A | 6/2017 |
| CN | 106912144 | A | 6/2017 |
| CN | 107046751 | A | 8/2017 |
| CN | 107069726 | A | 8/2017 |
| CN | 107645804 | A | 1/2018 |
| CN | 107995747 | A | 5/2018 |
| CN | 107995750 | A | 5/2018 |
| CN | 207460551 | U | 6/2018 |
| CN | 108337764 | A | 7/2018 |
| CN | 108366460 | A | 8/2018 |
| CN | 207744191 | U | 8/2018 |
| CN | 207910676 | U | 9/2018 |
| CN | 108834259 | A | 11/2018 |
| CN | 109246885 | A | 1/2019 |
| CN | 208572500 | U | 3/2019 |
| CN | 109729621 | A | 5/2019 |
| CN | 110086362 | A | 8/2019 |
| CN | 110099495 | A | 8/2019 |
| CN | 110493913 | A | 11/2019 |
| EP | 2403318 | A1 | 1/2012 |
| EP | 2590477 | A1 | 5/2013 |
| EP | 2938164 | A2 | 10/2015 |
| JP | 2008-010152 | A | 1/2008 |
| JP | 2011-249328 | A | 12/2011 |
| TW | 201125441 | A | 7/2011 |
| TW | 201132241 | A | 9/2011 |
| TW | 201143501 | A | 12/2011 |
| TW | 201143530 | A | 12/2011 |
| TW | 201146087 | A | 12/2011 |
| TW | 201204168 | A | 1/2012 |
| TW | 201208463 | A | 2/2012 |
| TW | 201208481 | A | 2/2012 |
| TW | 201208486 | A | 2/2012 |
| TW | 201215228 | A | 4/2012 |
| TW | 201233021 | A | 8/2012 |
| TW | 201244543 | A | 11/2012 |
| TW | I387396 | B | 2/2013 |
| TW | 201315118 | A | 4/2013 |
| TW | 201322825 | A | 6/2013 |
| TW | 201336345 | A | 9/2013 |
| TW | 201342987 | A | 10/2013 |
| TW | 201348909 | A | 12/2013 |
| TW | I422130 | B | 1/2014 |

(56) References Cited

FOREIGN PATENT DOCUMENTS

| TW | I423732 B | 1/2014 |
|---|---|---|
| TW | 201412189 A | 3/2014 |
| TW | 201414146 A | 4/2014 |
| TW | I434616 B | 4/2014 |
| TW | M477115 U | 4/2014 |
| TW | 201417626 A | 5/2014 |
| TW | 201417631 A | 5/2014 |
| TW | 201422045 A | 6/2014 |
| TW | 201424454 A | 6/2014 |
| TW | I441428 B | 6/2014 |
| TW | I448198 B | 8/2014 |
| TW | 201503756 A | 1/2015 |
| TW | 201515514 A | 4/2015 |
| TW | I496502 B | 8/2015 |
| TW | 201603644 A | 1/2016 |
| TW | 201607368 A | 2/2016 |
| TW | I524814 B | 3/2016 |
| TW | I535175 B | 5/2016 |
| TW | I540809 B | 7/2016 |
| TW | 201630468 A | 8/2016 |
| TW | 201639415 A | 11/2016 |
| TW | I630842 B | 7/2018 |
| TW | 201909699 A | 3/2019 |
| TW | 201927074 A | 7/2019 |
| WO | 2008/112820 A2 | 9/2008 |

OTHER PUBLICATIONS

United States Patent and Trademark Office, Notice of Allowance mailed Dec. 19, 2022, in U.S. Appl. No. 17/528,153.
United States Patent and Trademark Office, Notice of Allowance mailed Feb. 14, 2023, in U.S. Appl. No. 17/520,573.
United States Patent and Trademark Office, Notice of Allowance mailed Feb. 7, 2024, in U.S. Appl. No. 17/502,916.
United States Patent and Trademark Office, Notice of Allowance mailed Feb. 8, 2023, in U.S. Appl. No. 17/554,306.
United States Patent and Trademark Office, Notice of Allowance mailed Jan. 19, 2023, in U.S. Appl. No. 17/528,153.
United States Patent and Trademark Office, Notice of Allowance mailed Jun. 6, 2023, in U.S. Appl. No. 17/578,706.
United States Patent and Trademark Office, Notice of Allowance mailed May 30, 2023, in U.S. Appl. No. 17/503,238.
United States Patent and Trademark Office, Notice of Allowance mailed Nov. 2, 2022, in U.S. Appl. No. 17/023,632.
United States Patent and Trademark Office, Notice of Allowance mailed Nov. 6, 2023, in U.S. Appl. No. 18/103,971.
United States Patent and Trademark Office, Notice of Allowance mailed Oct. 4, 2022, in U.S. Appl. No. 17/554,306.
United States Patent and Trademark Office, Notice of Allowance mailed Sep. 12, 2022, in U.S. Appl. No. 17/023,632.
United States Patent and Trademark Office, Office Action mailed Apr. 1, 2024, in U.S. Appl. No. 18/242,474.
United States Patent and Trademark Office, Office Action mailed Apr. 26, 2022, in U.S. Appl. No. 17/023,632.
United States Patent and Trademark Office, Office Action mailed Dec. 15, 2021, in U.S. Appl. No. 17/023,632.
United States Patent and Trademark Office, Office Action mailed Feb. 3, 2023, in U.S. Appl. No. 17/503,238.
United States Patent and Trademark Office, Office Action mailed Jan. 22, 2024, in U.S. Appl. No. 18/220,584.
United States Patent and Trademark Office, Office Action mailed Jan. 26, 2023, in U.S. Appl. No. 17/578,706.
United States Patent and Trademark Office, Office Action mailed Jul. 15, 2022, in U.S. Appl. No. 17/528,153.
United States Patent and Trademark Office, Office Action mailed Jun. 12, 2023, in U.S. Appl. No. 18/103,971.
United States Patent and Trademark Office, Office Action mailed Mar. 21, 2024, in U.S. Appl. No. 18/238,990.
United States Patent and Trademark Office, Office Action mailed Mar. 22, 2023, in U.S. Appl. No. 17/502,916.
United States Patent and Trademark Office, Office Action mailed Oct. 19, 2022, in U.S. Appl. No. 17/520,573.
United States Patent and Trademark Office, Office Action mailed Oct. 5, 2022, in U.S. Appl. No. 17/502,916.
United States Patent and Trademark Office, Office Action mailed Sep. 12, 2022, in U.S. Appl. No. 17/503,238.
United States Patent and Trademark Office, Office Action mailed Sep. 14, 2022, in U.S. Appl. No. 17/545,752.
United States Patent and Trademark Office, Office Action mailed Sep. 16, 2022, in U.S. Appl. No. 17/578,706.
United States Patent and Trademark Office, Office Action mailed Sep. 19, 2023, in U.S. Appl. No. 17/502,916.
China Patent Office, Notice of Allowance mailed Sep. 1, 2021, in Application No. 201911371960.8.
China Patent Office, Office Action mailed Apr. 15, 2021, in Application No. 201911371960.8.
China Patent Office, Office Action mailed Apr. 30, 2021, in Application No. 201910719931.X.
China Patent Office, Office Action mailed Aug. 28, 2015, in Application No. 201410322602.9.
China Patent Office, Office Action mailed Aug. 8, 2015, in Application No. 201410172086.6.
China Patent Office, Office Action mailed Dec. 14, 2015, in Application No. 201210166672.0.
China Patent Office, Office Action mailed Dec. 3, 2018, in Application No. 201710557179.4.
China Patent Office, Office Action mailed Feb. 1, 2021, in Application No. 201911140844.5.
China Patent Office, Office Action mailed Feb. 3, 2021, in Application No. 201911316902.5.
China Patent Office, Office Action mailed Jan. 17, 2022, in Application No. 201910124049.0.
China Patent Office, Office Action mailed Jan. 9, 2020, in Application No. 201710828263.5.
China Patent Office, Office Action mailed Jul. 7, 2014, in Application No. 201210468505.1.
China Patent Office, Office Action mailed Jun. 3, 2014, in Application No. 201110103130.4.
China Patent Office, Office Action mailed Jun. 30, 2015, in Application No. 201410171893.6.
China Patent Office, Office Action mailed Mar. 2, 2016, in Application No. 201410172086.6.
China Patent Office, Office Action mailed Mar. 22, 2016, in Application No. 201410322612.2.
China Patent Office, Office Action mailed Mar. 22, 2019, in Application No. 201711464007.9.
China Patent Office, Office Action mailed May 26, 2021, in Application No. 201910124049.0.
China Patent Office, Office Action mailed Nov. 15, 2014, in Application No. 201210166672.0.
China Patent Office, Office Action mailed Nov. 15, 2021, in Application No. 201911316902.5.
China Patent Office, Office Action mailed Nov. 2, 2020, in Application No. 201910124049.0.
China Patent Office, Office Action mailed Nov. 23, 2021, in Application No. 201911140844.5.
China Patent Office, Office Action mailed Nov. 29, 2018, in Application No. 201710828263.5.
China Patent Office, Office Action mailed Oct. 19, 2015, in Application No. 201410322612.2.
China Patent Office, Office Action mailed Sep. 2, 2016, in Application No. 201510103579.9.
Qi et al., "Sine Wave Dimming Circuit Based on PIC16 MCU," Electronic Technology Application in 2014, vol. 10, (2014).
Taiwan Intellectual Property Office, Office Action mailed Apr. 18, 2016, in Application No. 103140989.
Taiwan Intellectual Property Office, Office Action mailed Apr. 27, 2020, in Application No. 108116002.
Taiwan Intellectual Property Office, Office Action mailed Apr. 7, 2021, in Application No. 109111042.
Taiwan Intellectual Property Office, Office Action mailed Aug. 23, 2017, in Application No. 106103535.

(56) References Cited

OTHER PUBLICATIONS

Taiwan Intellectual Property Office, Office Action mailed Aug. 27, 2020, in Application No. 107107508.
Taiwan Intellectual Property Office, Office Action mailed Dec. 27, 2019, in Application No. 108116002.
Taiwan Intellectual Property Office, Office Action mailed Feb. 11, 2020, in Application No. 107107508.
Taiwan Intellectual Property Office, Office Action mailed Feb. 27, 2018, in Application No. 106136242.
Taiwan Intellectual Property Office, Office Action mailed Feb. 6, 2018, in Application No. 106130686.
Taiwan Intellectual Property Office, Office Action mailed Jan. 14, 2019, in Application No. 107107508.
Taiwan Intellectual Property Office, Office Action mailed Jan. 21, 2021, in Application No. 109108798.
Taiwan Intellectual Property Office, Office Action mailed Jan. 4, 2021, in Application No. 109111042.
Taiwan Intellectual Property Office, Office Action mailed Jan. 7, 2014, in Application No. 100119272.
Taiwan Intellectual Property Office, Office Action mailed Jun. 16, 2020, in Application No. 108136083.
Taiwan Intellectual Property Office, Office Action mailed Jun. 9, 2014, in Application No. 101124982.
Taiwan Intellectual Property Office, Office Action mailed May 28, 2019, in Application No. 107112306.
Taiwan Intellectual Property Office, Office Action mailed Nov. 13, 2015, in Application No. 103141628.
Taiwan Intellectual Property Office, Office Action mailed Nov. 30, 2020, in Application No. 107107508.
Taiwan Intellectual Property Office, Office Action mailed Oct. 31, 2019, in Application No. 107107508.
Taiwan Intellectual Property Office, Office Action mailed Sep. 17, 2015, in Application No. 103127108.
Taiwan Intellectual Property Office, Office Action mailed Sep. 17, 2015, in Application No. 103127620.
Taiwan Intellectual Property Office, Office Action mailed Sep. 25, 2014, in Application No. 101148716.
Taiwan Intellectual Property Office, Office Action mailed Sep. 9, 2020, in Application No. 108148566.
United States Patent and Trademark Office, Notice of Allowance mailed Apr. 12, 2023, in U.S. Appl. No. 17/545,752.
United States Patent and Trademark Office, Office Action mailed Aug. 20, 2024, in U.S. Appl. No. 18/238,990.
United States Patent and Trademark Office, Office Action mailed Jan. 15, 2025, in U.S. Appl. No. 18/144,096.
United States Patent and Trademark Office, Office Action mailed Jan. 17, 2025, in U.S. Appl. No. 18/238,990.
United States Patent and Trademark Office, Notice of Allowance mailed Apr. 17, 2025, in U.S. Appl. No. 18/144,096.
United States Patent and Trademark Office, Notice of Allowance mailed Jun. 6, 2025, in U.S. Appl. No. 18/238,990.
United States Patent and Trademark Office, Notice of Allowance mailed Jun. 27, 2025, in U.S. Appl. No. 18/500,903.

* cited by examiner

LED LIGHTING SYSTEMS WITH TRIAC DIMMERS AND METHODS THEREOF

1. CROSS-REFERENCES TO RELATED APPLICATIONS

This application is a continuation of U.S. patent application Ser. No. 18/103,971, filed Jan. 31, 2023, which is a continuation of U.S. patent application Ser. No. 17/023,632, filed Sep. 17, 2020, which is a divisional of U.S. patent application Ser. No. 16/226,424, filed Dec. 19, 2018, which claims priority to Chinese Patent Application No. 201711464007.9, filed Dec. 28, 2017, all of these applications being incorporated by reference herein for all purposes.

2. BACKGROUND OF THE INVENTION

Certain embodiments of the present invention are directed to circuits. More particularly, some embodiments of the invention provide lighting systems and methods with Triode for Alternating Current (TRIAC) dimmers. Merely by way of example, some embodiments of the invention have been applied to light emitting diodes (LEDs). But it would be recognized that the invention has a much broader range of applicability.

As anew energy-saving and environmentally-friendly light source, light emitting diode (LED) is widely used in various fields due to its high luminance, low power consumption and long life span. For example, within a range close to a rated current, luminance of an LED often is directly proportional to the current flowing through the LED but is independent of the voltage across the LED; therefore, LED is often supplied with power from a constant current source during operation.

FIG. 1 is an exemplary circuit diagram showing a conventional linear constant current LED lighting system with a Triode for Alternating Current (TRIAC) dimmer. The linear constant current LED lighting system 100 is widely used in various fields such as LED lighting due to the system's simple and reliable structure and low cost. As shown in FIG. 1, the main control unit of the system 100 includes: an error amplifier U1, a transistor M1 for power regulation, and an LED current sensing resistor R1. The positive input terminal of the amplifier U1 receives a reference voltage $V_{ref}$, and the negative input terminal of the amplifier U1 is connected to the sensing resistor R1. Additionally, the output terminal of the amplifier U1 is connected to the gate terminal of the transistor M1 for power regulation.

As shown in FIG. 1, after the system 100 is powered on, an AC input voltage (e.g., VAC) is received by a TRIAC dimmer 190 and subjected to a full-wave rectification process performed by a full-wave rectifying bridge BD1 to generate a rectified voltage 101 (e.g., $V_{bulk}$). For example, the rectified voltage 101 does not drop below 0 volt. Also, after the system 100 is powered on, the amplifier U1 of the main control unit controls the voltage 103 of the gate terminal of the transistor M1, so that the transistor M1 is closed (e.g., the transistor M1 being turned on). As an example, the voltage 101 (e.g., $V_{bulk}$) is higher than a minimum forward operating voltage of the one or more LEDs, and a current 105 flows through the one or more LEDs to the sensing resistor R1 via the transistor M1.

The sensing resistor R1 includes two terminals. For example, one terminal of the sensing resistor R1 is grounded, and another terminal of the sensing resistor R1 generates a voltage (e.g., $V_{sense}$). As an example, the magnitude of the voltage (e.g., $V_{sense}$) across the resistor R1 corresponds to the current 105 flowing through the one or more LEDs. The amplifier U1 receives the voltage $V_{sense}$ at one input terminal and receives the reference voltage $V_{ref}$ at another input terminal, and performs an error amplification process on the voltage $V_{sense}$ and the reference voltage $V_{ref}$ in order to adjust the gate voltage 103 of the transistor M1 and realize constant current control for the one or more LEDs. The LED current $I_{led}$ (e.g., the current flowing through the one or more LEDs) is shown in Equation 1:

$$I_{led} = \frac{V_{ref}}{R_1} \quad \text{(Equation 1)}$$

where $R_1$ represents the resistance of the resistor R1, and $V_{ref}$ represents the reference voltage.

FIG. 2 shows simplified conventional timing diagrams for the LED lighting system 100 as shown in FIG. 1. The waveform 210 represents the rectified voltage $V_{bulk}$ (e.g., the rectified voltage 101) as a function of time, the waveform 220 represents the voltage of the gate terminal of the transistor M1 (e.g., the gate voltage 103) as a function of time, and the waveform 230 represents the LED current $I_{led}$ (e.g., the current 105 flowing through the one or more LEDs) as a function of time.

In certain TRIAC dimmer applications, the AC input voltage (e.g., VAC) is, for example, clipped by the TRIAC dimmer 190 and also rectified to generate the rectified voltage 101 (e.g., $V_{bulk}$), which is received by an anode of the one or more LEDs. As shown by the waveform 210, during one or more time durations (e.g., from time $t_1$ to time $t_2$), the rectified voltage 101 (e.g., $V_{bulk}$) either is larger than zero but still small in magnitude or is equal to zero because the TRIAC dimmer 190 operates in an off cycle, so that the voltage 101 (e.g., $V_{bulk}$) is lower than the minimum forward operating voltage of the one or more LEDs. For example, during the off cycle, the TRIAC dimmer 190 clips the AC input voltage (e.g., VAC) so that the rectified voltage 101 (e.g., $V_{bulk}$) equals zero in magnitude. As an example, from time $t_1$ to time $t_2$, the one or more LEDs cannot be turned on due to insufficient magnitude of the voltage 101 and the LED current $I_{led}$ is equal to zero, as shown by the waveforms 210 and 230. At this point (e.g., at a time between time $t_1$ and time $t_2$), the constant current control circuit of FIG. 1 is still working. For example, the voltage $V_{bulk}$ is low and no current flows through the one or more LEDs, so the voltage of the gate terminal of the transistor M1, which is provided by the output terminal of the U1 amplifier, is at a high voltage level (e.g., at a voltage level $V_2$ from time $t_1$ to time $t_2$ as shown by the waveform 220). As an example, as shown by the waveform 220, prior to the time $t_1$, the voltage of the gate terminal of the transistor M1 is at a low voltage level (e.g., at a voltage level $V_1$). For example, the voltage level $V_2$ is higher than the voltage level $V_1$, and the voltage level $V_1$ is higher than a threshold voltage of the gate terminal for turning on the transistor M1.

As shown in FIG. 2, at time $t_2$, the TRIAC dimmer 190 enters an on cycle, during which, the TRIAC dimmer 190 does not clip the AC input voltage (e.g., VAC), as shown by the waveform 210. For example, at time $t_2$, the $V_{bulk}$ voltage increases rapidly while the voltage of the gate terminal of the transistor M1 is at the high voltage level, causing the LED current $I_{led}$ to overshoot, as shown by the waveforms 210, 220 and 230. During the loop adjustment process for constant current of the LED lighting system 100, after overshoot of the LED current $I_{led}$, there is an oscillation period (e.g., from time $t_2$ to time $t_3$) as shown by the waveforms 220 and 230.

As discussed above, a resulting problem of the LED lighting system 100 is that the change in the $V_{bulk}$ voltage caused by the TRIAC dimmer 190 can cause overshoot and oscillation of the LED current $I_{led}$. For some TRIAC dimmers, this type of current overshoot and oscillation may even cause the TRIAC dimmer (e.g., the TRIAC dimmer 190) to operate abnormally (e.g., causing the TRIAC dimmer 190 to misfire), which in turn causes abnormal fluctuations in the LED current $I_{led}$ and causes the one or more LEDs to flicker.

Hence it is highly desirable to improve techniques related to LED lighting systems with TRIAC dimmers.

3. BRIEF SUMMARY OF THE INVENTION

Certain embodiments of the present invention are directed to circuits. More particularly, some embodiments of the invention provide lighting systems and methods with Triode for Alternating Current (TRIAC) dimmers. Merely by way of example, some embodiments of the invention have been applied to light emitting diodes (LEDs). But it would be recognized that the invention has a much broader range of applicability.

Some embodiments of the present invention provide a high-compatibility TRIAC dimmer control system for an LED lighting system and a method of using such switch control system. For example, the TRIAC dimmer control system eliminates current overshoot and oscillation caused by a sudden change of a rectified voltage during a TRIAC dimming process by controlling enablement of a constant current circuit of the system. As an example, the TRIAC dimmer control system prevents a TRIAC dimmer from operating abnormally due to current surges and thus improves the compatibility of LED lighting system with TRIAC dimmer.

In certain embodiments, a system for LED switch control is provided. For example, the system includes a rectifying module configured to rectify an input voltage that has been processed by a TRIAC dimmer and to transmit the rectified voltage to a combination of one or more LEDs, the combination of the one or more LEDs being coupled to a constant current module and an enablement control module. As an example, the system also includes the enablement control module configured to receive a sensing voltage corresponding to the rectified voltage, to compare the sensing voltage with a predetermined threshold voltage, to output an enablement signal at a logic low level if the sensing voltage is lower than the predetermined threshold voltage, and to output the enablement signal at a logic high level if the sensing voltage is higher than the predetermined threshold voltage. As an example, the system also includes the constant current module configured to receive the enablement signal, to allow a current to flow through the combination of the one or more LEDs if the enablement signal is at the logic high level, and to not allow the current to flow through the combination of the one or more LEDs if the enablement signal is at the logic low level. In some embodiments, an LED lighting system including an LED switch control system is provided.

According to certain embodiments, a system for controlling one or more light emitting diodes includes a current regulation circuit coupled to a cathode of one or more light emitting diodes. The one or more light emitting diodes include the cathode and an anode configured to receive a rectified voltage. Additionally, the system includes a control circuit coupled to the cathode of the one or more light emitting diodes. The control circuit is configured to receive a first voltage from the cathode of the one or more light emitting diodes, compare a second voltage and a threshold voltage, and generate a control signal based at least in part on the second voltage and the threshold voltage. The second voltage indicates a magnitude of the first voltage. The control circuit is further configured to: if the second voltage is larger than the threshold voltage, generate the control signal at a first logic level; and if the second voltage is smaller than the threshold voltage, generate the control signal at a second logic level. The current regulation circuit is configured to: receive the control signal from the control circuit; allow a current to flow through the one or more light emitting diodes if the control signal is at the first logic level, the current being larger than zero in magnitude; and not allow the current to flow through the one or more light emitting diodes if the control signal is at the second logic level.

According to some embodiments, a system for controlling one or more light emitting diodes includes a current regulation circuit configured to receive a rectified voltage and coupled to an anode of one or more light emitting diodes. The one or more light emitting diodes include the anode and a cathode. Additionally, the system includes a control circuit configured to receive the rectified voltage. The control circuit is configured to: compare an input voltage and a threshold voltage, the input voltage indicating a magnitude of the rectified voltage; and generate a control signal based at least in part on the input voltage and the threshold voltage. The control circuit is further configured to: if the input voltage is larger than the threshold voltage, generate the control signal at a first logic level; and if the input voltage is smaller than the threshold voltage, generate the control signal at a second logic level. The current regulation circuit is configured to: receive the control signal from the control circuit; allow a current to flow through the one or more light emitting diodes if the control signal is at the first logic level, the current being larger than zero in magnitude; and not allow the current to flow through the one or more light emitting diodes if the control signal is at the second logic level.

According to certain embodiments, a method for controlling one or more light emitting diodes includes: receiving a first voltage from a cathode of one or more light emitting diodes by a control circuit coupled to the cathode of the one or more light emitting diodes, the one or more light emitting diodes including the cathode and an anode configured to receive a rectified voltage; comparing a second voltage and a threshold voltage, the second voltage indicating a magnitude of the first voltage; generating a control signal at a first logic level if the second voltage is larger than the threshold voltage; generating the control signal at a second logic level if the second voltage is smaller than the threshold voltage; receiving the control signal from the control circuit by a current regulation circuit coupled to the cathode of one or more light emitting diodes; allowing a current to flow through the one or more light emitting diodes if the control signal is at the first logic level, the current being larger than zero in magnitude; and not allowing the current to flow through the one or more light emitting diodes if the control signal is at the second logic level.

According to some embodiments, a method for controlling one or more light emitting diodes includes: receiving a rectified voltage by a control circuit; comparing an input voltage and a threshold voltage, the input voltage indicating a magnitude of the rectified voltage; if the input voltage is larger than the threshold voltage, generating a control signal at a first logic level; if the input voltage is smaller than the threshold voltage, generating the control signal at a second logic level; receiving the control signal from the control circuit by a current regulation circuit configured to receive the rectified voltage and coupled to an anode of one or more light emitting diodes, the one or more light emitting diodes including the anode and a cathode; allowing a current to flow through the one or more light emitting diodes if the control signal is at the first logic level, the current being larger than zero in magnitude; and not allowing the current to flow through the one or more light emitting diodes if the control signal is at the second logic level.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

Depending upon embodiment, one or more benefits may be achieved. These benefits and various additional objects, features and advantages of the present invention can be fully appreciated with reference to the detailed description and accompanying drawings that follow.

5. DETAILED DESCRIPTION OF THE INVENTION

Certain embodiments of the present invention are directed to circuits. More particularly, some embodiments of the invention provide lighting systems and methods with Triode for Alternating Current (TRIAC) dimmers. Merely by way of example, some embodiments of the invention have been applied to light emitting diodes (LEDs). But it would be recognized that the invention has a much broader range of applicability.

Figure 1:
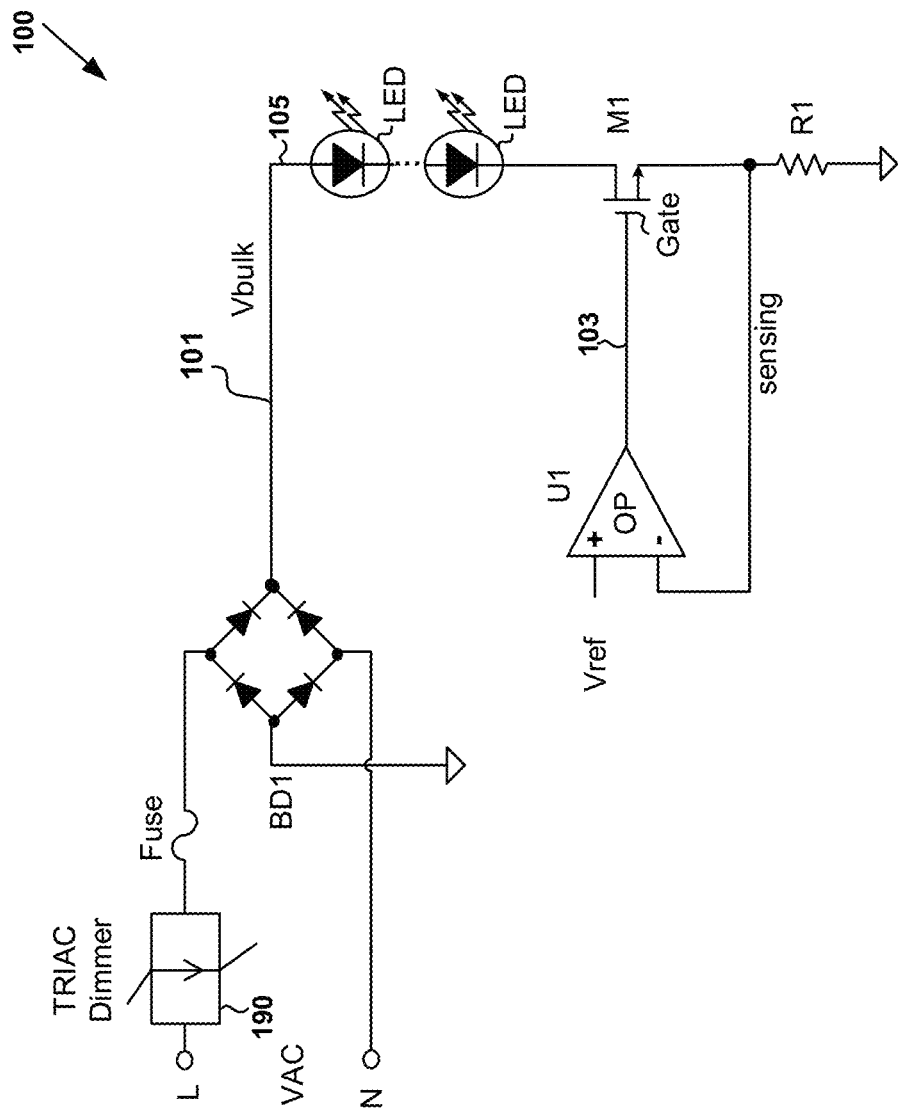
FIG. 1 is an exemplary circuit diagram showing a conventional linear constant current LED lighting system with a Triode for Alternating Current (TRIAC) dimmer.
Figure 2:
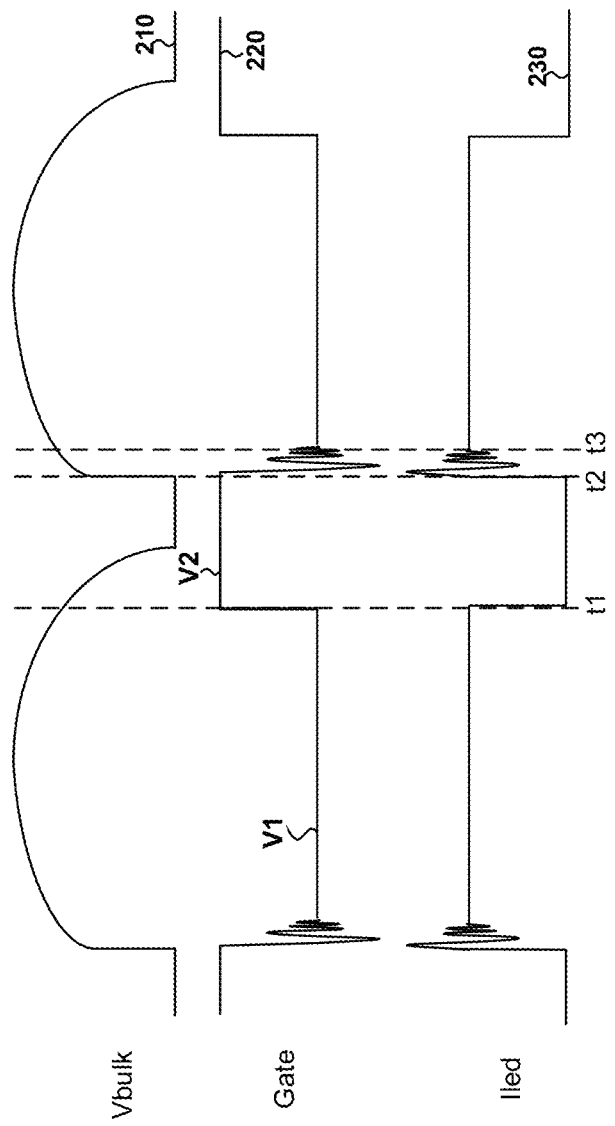
FIG. 2 shows simplified conventional timing diagrams for the LED lighting system as shown in FIG. 1.
Figure 3:
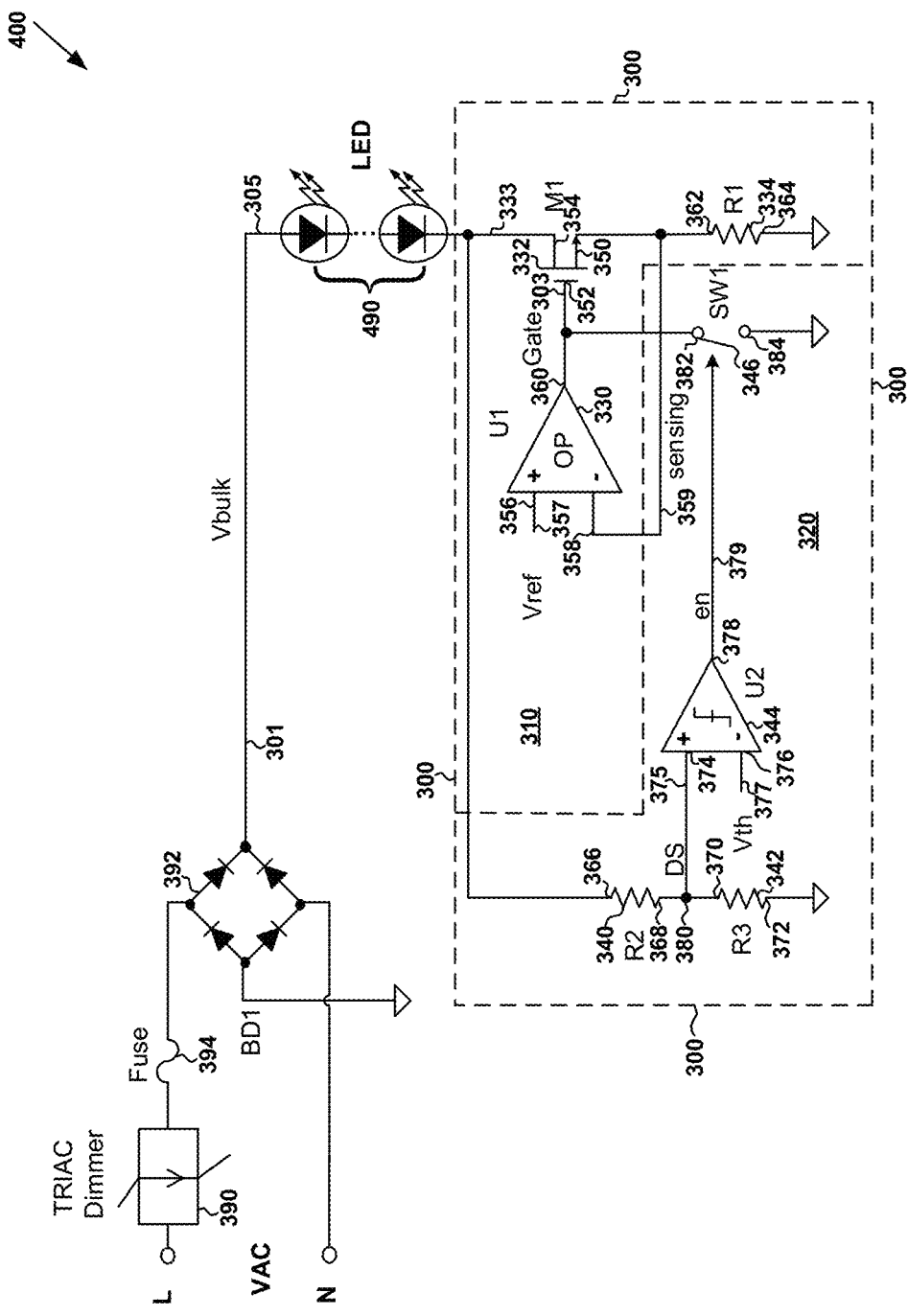
FIG. 3 is a simplified circuit diagram showing an LED lighting system with a TRIAC dimmer according to some embodiments of the present invention.

FIG. 3 is a simplified circuit diagram showing an LED lighting system with a TRIAC dimmer according to some embodiments of the present invention. This diagram is merely an example, which should not unduly limit the scope of the claims. One of ordinary skill in the art would recognize many variations, alternatives, and modifications. As shown in FIG. 3, the LED lighting system 400 includes a line (L) terminal and a neutral (N) terminal, and the system 400 also includes a TRIAC dimmer 390, a full-wave rectifying bridge 392 (e.g., a full-wave rectifying bridge BD1), a fuse 394, and a system controller 300. In some examples, the system controller 300 includes a constant current circuit 310 and a control circuit 320 (e.g., an enablement control circuit). For example, the system controller 300 is located on a chip. As an example, the constant current circuit 310 includes an amplifier 330 (e.g., an error amplifier U1), a transistor 332 (e.g., a transistor M1 for power regulation), and a resistor 334 (e.g., a sensing resistor R1). For example, the control circuit 320 includes a resistor 340 (e.g., a resistor R2), a resistor 342 (e.g., a resistor R3), a comparator 344 (e.g., a comparator U2), and a switch 346 (e.g., a switch SW1). In certain examples, the LED lighting system 400 provides a current 305 (e.g., an LED current $I_{led}$) that flows through one or more LEDs 490, the transistor 332 (e.g., the transistor M1 for power regulation), and the resistor 334 (e.g., the sensing resistor R1). For example, one or more LEDs 490 include multiple LEDs connected in series. Although the above has been shown using a selected group of components for the LED lighting system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, an AC input voltage (e.g., VAC) is received by the TRIAC dimmer 390 and also rectified (e.g., by the full-wave rectifying bridge 392) to generate a rectified voltage 301 (e.g., a rectified voltage $V_{bulk}$). For example, the full-wave rectifying bridge 392 is coupled to the TRIAC dimmer 390 through the fuse 394. As an example, the rectified voltage 301 does not fall below the ground voltage of the system (e.g., zero volt). In some embodiments, the transistor 332 (e.g., the transistor M1 for power regulation) includes a source terminal 350, a gate terminal 352 and a drain terminal 354, the amplifier 330 (e.g., the error amplifier U1) includes input terminals 356 and 358 and an output terminal 360, and the resistor 334 (e.g., the sensing resistor R1) includes terminals 362 and 364. For example, the source terminal 350 of the transistor 332 is connected to the terminal 362 of the resistor 334, the gate terminal 352 of the transistor 332 is connected to the output terminal 360 of the amplifier 330, and the drain terminal 354 of the transistor 332 is connected to a cathode of the one or more LEDs 490. As an example, an anode of the one or more LEDs 490 receives the rectified voltage 301 (e.g., a rectified voltage $V_{bulk}$), and the terminal 364 of the resistor 334 is biased to the ground voltage of the system (e.g., zero volt).

According to certain embodiments, the resistor 340 (e.g., the resistor R2) includes terminals 366 and 368, the resistor 342 (e.g., the resistor R3) includes terminals 370 and 372, and the comparator 344 (e.g., the comparator U2) includes an input terminal 374 (e.g., a non-inverting terminal), an input terminal 376 (e.g., an inverting terminal), and an output terminal 378. For example, the terminal 366 of the resistor 340 is connected to the drain terminal 354 of the transistor 332, and the terminal 372 of the resistor 342 is biased to the ground voltage of the system (e.g., zero volt). As an example, the terminal 368 of the resistor 340 and the terminal 370 of the resistor 342 are connected at a node 380 (e.g., a node DS), and the node 380 (e.g., the node DS) is connected to the input terminal 374 of the comparator 344. For example, the input terminal 374 of the comparator 344 is configured to detect a change of a voltage 333 of the drain terminal 354 of the transistor 332.

According to some embodiments, the input terminal 374 (e.g., the positive terminal) of the comparator 344 receives a voltage 375 of the node 380 (e.g., the node DS), which is connected to the terminal 368 of the resistor 340 and the terminal 370 of the resistor 342. For example, the voltage 375 is directly proportional to the voltage 333 of the drain terminal 354 of the transistor 332. As an example, the input terminal 376 (e.g., the negative terminal) of the comparator 344 receives a threshold voltage 377 (e.g., a threshold voltage $V_{th}$).

In certain embodiments, the comparator 344 compares the voltage 375 and the threshold voltage 377 and generates a control signal 379 (e.g., a control signal en). For example, if the voltage 375 is larger than the threshold voltage 377, the control signal 379 is at a logic high level. As an example, if the voltage 375 is smaller than the threshold voltage 377, the control signal 379 is at a logic low level. In some embodiments, the comparator 344 outputs the control signal 379 at the output terminal 378, and sends the control signal 379 to the switch 346 (e.g., the switch SW1) of the constant current circuit 310.

In some embodiments, the switch 346 includes terminals 382 and 384. For example, the terminal 382 is connected to the output terminal 360 of the amplifier 330, and the terminal 384 is biased to the ground voltage of the system (e.g., zero volt). As an example, the switch 346 receives the control signal 379. In certain examples, if the control signal 379 is at the logic high level, the switch 346 is open. For example, if the switch 346 is open, the constant current circuit 310 is enabled. As an example, if the switch 346 is open, a voltage 303 (e.g., a voltage Gate) of the gate terminal 352 of the transistor 332 is generated by the amplifier 330 (e.g., the error amplifier U1). In some examples, if the control signal 379 is at the logic low level, the switch 346 is closed. As an example, if the switch 346 is closed, the constant current circuit 310 is disabled. For example, if the switch 346 is closed, the voltage 303 of the gate terminal 352 of the transistor 332 is biased to the ground voltage of the system (e.g., zero volt).

According to some embodiments, if the voltage 375 is smaller than the threshold voltage 377, the constant current circuit 310 is disabled by the control signal 379. For example, if the voltage 375 is smaller than the threshold voltage 377, the voltage 333 of the drain terminal 354 of the transistor 332 is too low for the LED lighting system 400 to provide a constant current to the one or more LEDs 490. As an example, if the constant current circuit 310 is disabled, the current 305 (e.g., the LED current $I_{led}$) that flows through the one or more LEDs 490 is equal to zero in magnitude. For example, if the voltage 375 is smaller than the threshold voltage 377, the constant current circuit 310 does not allow the current 305 (e.g., the LED current $I_{led}$) with a magnitude larger than zero to flow through the one or more LEDs 490.

According to certain embodiments, if the voltage 375 is larger than the threshold voltage 377, the constant current circuit 310 is enabled by the control signal 379. As an example, if the voltage 375 is larger than the threshold voltage 377, the voltage 333 of the drain terminal 354 of the transistor 332 is high enough for the LED lighting system 400 to provide a constant current to the one or more LEDs 490. For example, if the voltage 375 is larger than the threshold voltage 377, the voltage 333 of the drain terminal 354 of the transistor 332 is higher than the minimum voltage value that is needed for the LED lighting system 400 to provide a constant current to the one or more LEDs 490. As an example, if the constant current circuit 310 is enabled, the current 305 that flows through the one or more LEDs 490 is equal to a constant that is larger than zero in magnitude. For example, if the voltage 375 is larger than the threshold voltage 377, the constant current circuit 310 allows the current 305 (e.g., the LED current $I_{led}$) with a magnitude larger than zero to flow through the one or more LEDs 490.

As shown in FIG. 3, the amplifier 330 includes the input terminal 356 (e.g., a non-inverting terminal), the input terminal 358 (e.g., an inverting terminal), and the output terminal 360, according to one embodiment. In some examples, the input terminal 356 (e.g., the positive terminal) receives a reference voltage 357 (e.g., a reference voltage $V_{ref}$). In certain examples, the input terminal 358 (e.g., the negative terminal) is connected to the source terminal 350 of the transistor 332 and the terminal 362 of the resistor 334, and receives a voltage 359 (e.g., a voltage $V_{sense}$). For example, the terminal 364 of the resistor 334 is biased to the ground voltage of the system (e.g., zero volt), and the voltage 359 at the terminal 362 of the resistor 334 corresponds to the current 305 that flows through the one or more LEDs 490. As an example, if the switch 346 is open, the amplifier 330 (e.g., the error amplifier U1) generates the voltage 303 based at least in part on the reference voltage 357 (e.g., the reference voltage $V_{ref}$) and the voltage 359 (e.g., the voltage $V_{sense}$), and outputs the voltage 303 at the output terminal 360. For example, the voltage 303 is received by the gate terminal 352 of the transistor 332.

In some embodiments, after the constant current circuit 310 becomes enabled by the control signal 379, the voltage 303 of the gate terminal 352 generated by the amplifier 330 (e.g., the error amplifier U1) slowly increases from the ground voltage of the system (e.g., zero volt) to a desired voltage value, and the current 305 that flows through the one or more LEDs 490 also slowly increases from zero to a desired current value. For example, the voltage 303 slowly increases from the ground voltage of the system (e.g., zero volt) to the desired voltage value without overshoot and/or oscillation. As an example, the current 305 slowly increases from zero to the desired current value without overshoot and/or oscillation.

In certain embodiments, as shown in FIG. 3, the transistor 332 (e.g., the transistor M1 for power regulation) is a field effect transistor (e.g., a metal-oxide-semiconductor field effect transistor (MOSFET)). For example, the transistor 332 is an insulated gate bipolar transistor (IGBT). As an example, the transistor 332 is a bipolar junction transistor. In some examples, the system controller 300 includes more components or less components. In certain examples, the value of the reference voltage 357 (e.g., the reference voltage $V_{ref}$) and/or the value of the threshold voltage 377 (e.g., the threshold voltage $V_{th}$) can be set as desired by those skilled in the art.

Figure 4:
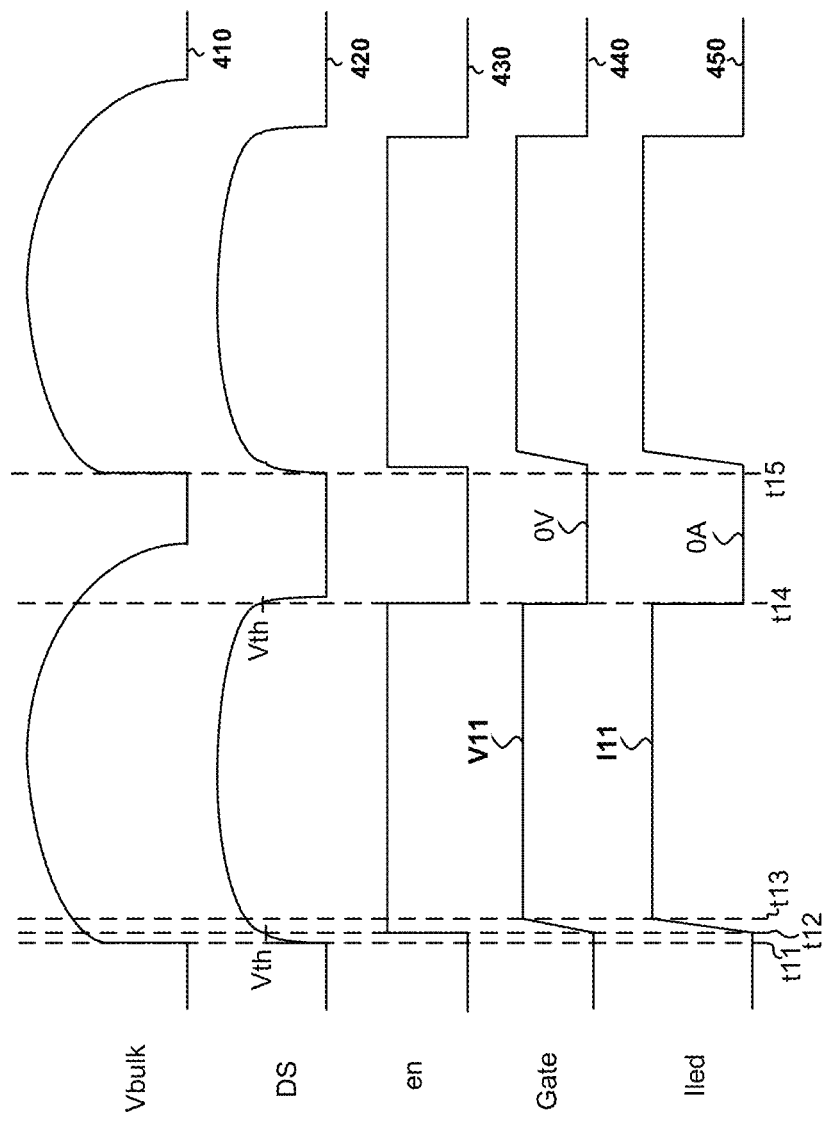
FIG. 4 shows simplified timing diagrams for controlling the LED lighting system 400 as shown in FIG. 3 according to some embodiments of the present invention.

FIG. 4 shows simplified timing diagrams for controlling the LED lighting system 400 as shown in FIG. 3 according to some embodiments of the present invention. These diagrams are merely examples, which should not unduly limit the scope of the claims. One of ordinary skill in the art would recognize many variations, alternatives, and modifications. The waveform 410 represents the rectified voltage $V_{bulk}$ (e.g., the rectified voltage 301) as a function of time, the waveform 420 represents the voltage 375 of the node DS (e.g., the node 380) as a function of time, the waveform 430 represents the control signal en (e.g., the control signal 379) as a function of time, the waveform 440 represents the voltage Gate (e.g., the voltage 303) as a function of time, and the waveform 430 represents the LED current $I_{led}$ (e.g., the current 305) as a function of time. According to some embodiments, the time period from time $t_{11}$ to time $t_{15}$ represents a half cycle of the AC input voltage (e.g., VAC). For example, the time period from time $t_{11}$ to time $t_{15}$ is equal to half a period of the AC input voltage (e.g., VAC).

According to certain embodiments, after the system 400 is powered on, the AC input voltage (e.g., VAC) is received by the TRIAC dimmer 390 and subjected to a full-wave rectification process performed by the full-wave rectifying bridge 392 (e.g., the full-wave rectifying bridge BD1) to generate the rectified voltage 301 (e.g., the rectified voltage $V_{bulk}$). According to some embodiments, at time $t_{11}$, the TRIAC dimmer 390 enters an on cycle, during which, the TRIAC dimmer 390 does not clip the AC input voltage (e.g., VAC). For example, at time $t_{11}$, the rectified voltage 301 (e.g., the rectified voltage $V_{bulk}$) increases rapidly as shown by the waveform 410.

In some examples, if the rectified voltage 301 (e.g., the rectified voltage $V_{bulk}$) becomes larger than a magnitude that is needed to provide a minimum forward operating voltage to the one or more LEDs 490, the rectified voltage 301 (e.g., the rectified voltage $V_{bulk}$) causes the voltage 333 of the drain terminal 354 of the transistor 332 to increase. In certain examples, the voltage 333 is received by a voltage divider including the resistor 340 (e.g., the resistor R2) and the resistor 342 (e.g., the resistor R3), and the voltage divider generates the voltage 375. As an example, if the voltage 333 of the drain terminal 354 of the transistor 332 increases, the voltage 375 of the node 380 (e.g., the node DS) also increases.

According to certain embodiments, at time $t_{11}$, the TRIAC dimmer 390 stops clipping the AC input voltage (e.g., VAC), and the voltage 375 of the node 380 (e.g., the node DS) starts to increase but remains smaller than the threshold voltage 377 (e.g., the threshold voltage $V_{th}$) as shown by the waveform 420. For example, at time $t_{11}$, the voltage 375 remains smaller than the threshold voltage 377 as shown by the waveform 420, the control signal 379 (e.g., the control signal en) remains at the logic low level as shown by the waveform 430, and the voltage 303 (e.g., the voltage Gate) of the gate terminal 352 of the transistor 332 remains biased to the ground voltage of the system (e.g., zero volt) as shown by the waveform 440. As an example, at time $t_{11}$, the constant current circuit 310 remains disabled by the control signal 379, and the current 305 (e.g., the LED current $I_{led}$) remains equal to zero in magnitude as shown by the waveform 450.

According to some embodiments, from time $t_{11}$ to time $t_{12}$, the voltage 375 of the node 380 (e.g., the node DS) increases but remains smaller than the threshold voltage 377 (e.g., the threshold voltage $V_{th}$) as shown by the waveform 420. For example, from time $t_{11}$ to time $t_{12}$, the voltage 375 remains smaller than the threshold voltage 377 as shown by the waveform 420, the control signal 379 (e.g., the control signal en) remains at the logic low level as shown by the waveform 430, and the voltage 303 (e.g., the voltage Gate) of the gate terminal 352 of the transistor 332 remains biased to the ground voltage of the system (e.g., zero volt) as shown by the waveform 440. As an example, from time $t_{11}$ to time $t_{12}$, the constant current circuit 310 remains disabled by the control signal 379, and the current 305 (e.g., the LED current $I_{led}$) remains equal to zero in magnitude as shown by the waveform 450.

According to certain embodiments, at time $t_{12}$, the voltage 375 of the node 380 (e.g., the node DS) becomes larger than the threshold voltage 377 (e.g., the threshold voltage $V_{th}$) as shown by the waveform 420. For example, at time $t_{12}$, the voltage 375 becomes larger than the threshold voltage 377 as shown by the waveform 420, the control signal 379 (e.g., the control signal en) changes from the logic low level to the logic high level as shown by the waveform 430, and the voltage 303 (e.g., the voltage Gate) of the gate terminal 352 of the transistor 332 starts to increase from the ground voltage of the system (e.g., zero volt) as shown by the waveform 440. As an example, at time $t_{12}$, the constant current circuit 310 becomes enabled by the control signal 379, and the current 305 (e.g., the LED current $I_{led}$) starts to increase from zero in magnitude as shown by the waveform 450.

According to some embodiments, from time $t_{12}$ to time $t_{13}$, the voltage 375 of the node 380 (e.g., the node DS) remains larger than the threshold voltage 377 (e.g., the threshold voltage $V_{th}$) as shown by the waveform 420. In certain examples, from time $t_{12}$ to time $t_{13}$, the voltage 375 remains larger than the threshold voltage 377 as shown by the waveform 420, the control signal 379 (e.g., the control signal en) remains at the logic high level as shown by the waveform 430, and the voltage 303 (e.g., the voltage Gate) of the gate terminal 352 of the transistor 332 increases from the ground voltage of the system (e.g., zero volt) to a voltage level $V_{11}$, as shown by the waveform 440. For example, the voltage level $V_{11}$ is higher than a threshold voltage of the gate terminal for turning on the transistor 332 (e.g., the transistor M1 for power regulation). In some examples, from time $t_{12}$ to time $t_{13}$, the constant current circuit 310 remains enabled by the control signal 379, and the current 305 (e.g., the LED current lea) increases from zero to a current level $I_{11}$ as shown by the waveform 450. As an example, the current level $I_{11}$ is a predetermined magnitude.

According to certain embodiments, at time $t_{13}$, the voltage 375 of the node 380 (e.g., the node DS) remains larger than the threshold voltage 377 (e.g., the threshold voltage $V_{th}$) as shown by the waveform 420. In certain examples, at time $t_{13}$, the voltage 375 remains larger than the threshold voltage 377 as shown by the waveform 420, the control signal 379 (e.g., the control signal en) remains at the logic high level as shown by the waveform 430, and the voltage 303 (e.g., the voltage Gate) of the gate terminal 352 of the transistor 332 reaches the voltage level $V_{11}$, as shown by the waveform 440. In some examples, at time $t_{13}$, the constant current circuit 310 remains enabled by the control signal 379, and the current 305 (e.g., the LED current $I_{led}$) reaches the current level $I_{11}$ as shown by the waveform 450.

According to some embodiments, from time $t_{13}$ to time $t_{14}$, the voltage 375 of the node 380 (e.g., the node DS) remains larger than the threshold voltage 377 (e.g., the threshold voltage $V_{th}$) as shown by the waveform 420. In certain examples, from time $t_{13}$ to time $t_{14}$, the voltage 375 remains larger than the threshold voltage 377 as shown by the waveform 420, the control signal 379 (e.g., the control signal en) remains at the logic high level as shown by the waveform 430, and the voltage 303 (e.g., the voltage Gate) of the gate terminal 352 of the transistor 332 remains constant at the voltage level $V_{11}$, as shown by the waveform 440. In some examples, from time $t_{13}$ to time $t_{14}$, the constant current circuit 310 remains enabled by the control signal 379, and the current 305 (e.g., the LED current $I_{led}$) remains constant at the current level $I_{11}$ as shown by the waveform 450.

According to certain embodiments, at time $t_{14}$, the voltage 375 of the node 380 (e.g., the node DS) becomes smaller than the threshold voltage 377 (e.g., the threshold voltage $V_{th}$) as shown by the waveform 420. For example, at time $t_{14}$, the voltage 375 becomes smaller than the threshold voltage 377 as shown by the waveform 420, the control signal 379 (e.g., the control signal en) changes from the logic high level to the logic low level as shown by the waveform 430, and the voltage 303 (e.g., the voltage Gate) of the gate terminal 352 of the transistor 332 decreases from the voltage level $V_{11}$ to the ground voltage of the system (e.g., zero volt) as shown by the waveform 440. As an example, at time $t_{14}$, the constant current circuit 310 becomes disabled by the control signal 379, and the current 305 (e.g., the LED current $I_{led}$) decreases from the current level $I_{11}$ to zero as shown by the waveform 450.

According to some embodiments, from time $t_{14}$ to time $t_{15}$, the voltage 375 of the node 380 (e.g., the node DS) remains smaller than the threshold voltage 377 (e.g., the threshold voltage $V_{th}$) as shown by the waveform 420. For example, from time $t_{14}$ to time $t_{15}$, the voltage 375 remains smaller than the threshold voltage 377 as shown by the waveform 420, the control signal 379 (e.g., the control signal en) remains at the logic low level as shown by the waveform 430, and the voltage 303 (e.g., the voltage Gate) of the gate terminal 352 of the transistor 332 remains at the ground voltage of the system (e.g., zero volt) as shown by the waveform 440. As an example, from time $t_{14}$ to time $t_{15}$, the constant current circuit 310 remains disabled by the control signal 379, and the current 305 (e.g., the LED current $I_{led}$) remains at zero as shown by the waveform 450.

Figure 5:
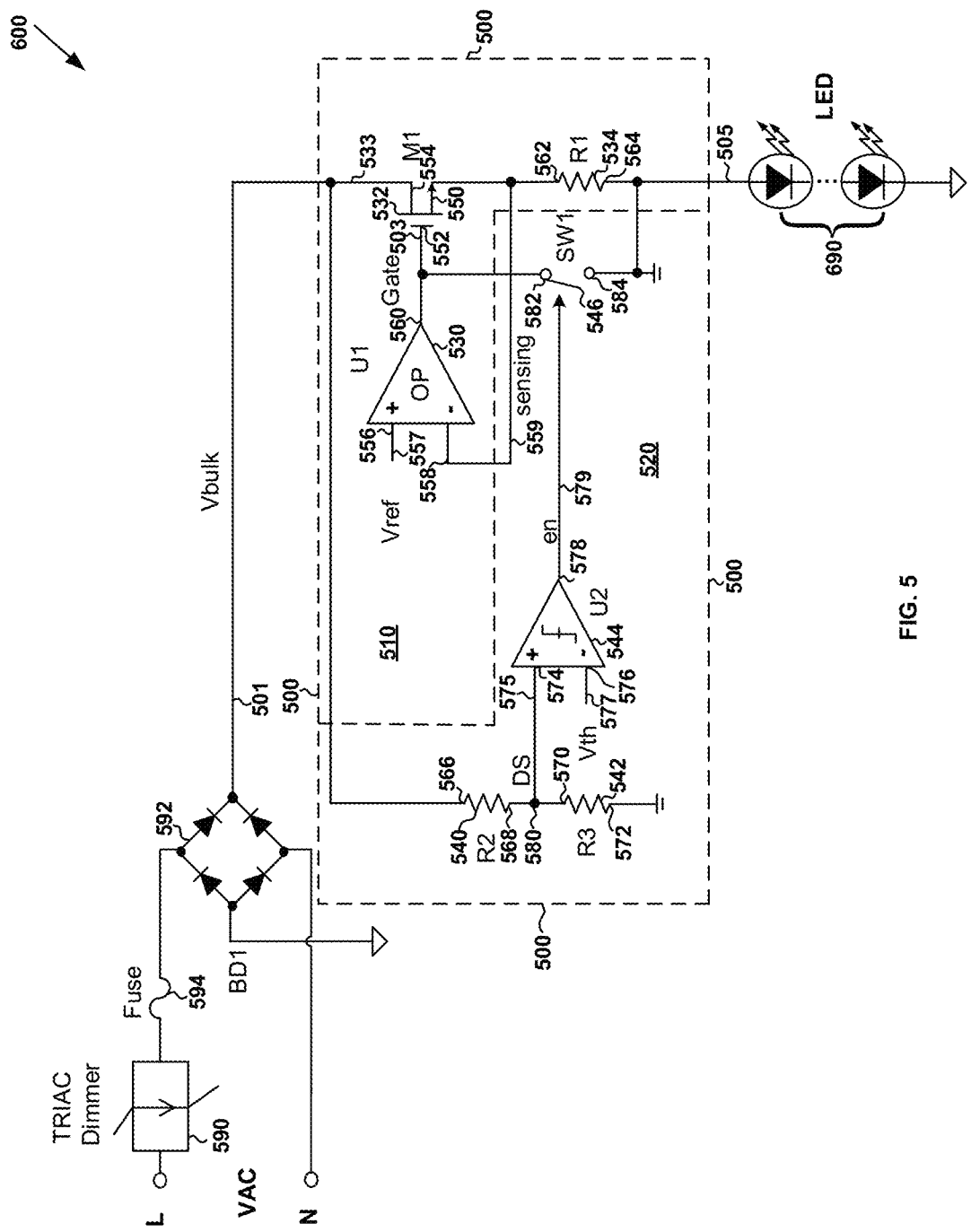
FIG. 5 is a simplified circuit diagram showing an LED lighting system with a TRIAC dimmer according to certain embodiments of the present invention.

FIG. 5 is a simplified circuit diagram showing an LED lighting system with a TRIAC dimmer according to certain embodiments of the present invention. This diagram is merely an example, which should not unduly limit the scope of the claims. One of ordinary skill in the art would recognize many variations, alternatives, and modifications. As shown in FIG. 5, the LED lighting system 600 includes a line (L) terminal and a neutral (N) terminal, and the system 600 also includes a TRIAC dimmer 590, a full-wave rectifying bridge 592 (e.g., a full-wave rectifying bridge BD1), a fuse 594, and a system controller 500. In some examples, the system controller 500 includes a constant current circuit 510 and a control circuit 520 (e.g., an enablement control circuit). For example, the system controller 500 is located on a chip. As an example, the constant current circuit 510 includes an amplifier 530 (e.g., an error amplifier U1), a transistor 532 (e.g., a transistor M1 for power regulation), and a resistor 534 (e.g., a sensing resistor R1). For example, the control circuit 520 includes a resistor 540 (e.g., a resistor R2), a resistor 542 (e.g., a resistor R3), a comparator 544 (e.g., a comparator U2), and a switch 546 (e.g., a switch SW1). In certain examples, the LED lighting system 400 provides a current 505 (e.g., an LED current $I_{led}$) that flows through the transistor 332 (e.g., the transistor M1 for power regulation), the resistor 334 (e.g., the sensing resistor R1), and one or more LEDs 690. For example, one or more LEDs 690 include multiple LEDs connected in series. Although the above has been shown using a selected group of components for the LED lighting system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, an AC input voltage (e.g., VAC) is received by the TRIAC dimmer 590 and also rectified (e.g., by the full-wave rectifying bridge 592) to generate a rectified voltage 501 (e.g., a rectified voltage $V_{bulk}$). For example, the full-wave rectifying bridge 592 is coupled to the TRIAC dimmer 590 through the fuse 594. As an example, the rectified voltage 501 does not fall below the ground voltage of the system (e.g., zero volt). In some embodiments, the transistor 532 (e.g., the transistor M1 for power regulation) includes a source terminal 550, a gate terminal 552 and a drain terminal 554, the amplifier 530 (e.g., the error amplifier U1) includes input terminals 556 and 558 and an output terminal 560, and the resistor 534 (e.g., the sensing resistor R1) includes terminals 562 and 564. For example, the source terminal 550 of the transistor 532 is connected to the terminal 562 of the resistor 534, the gate terminal 552 of the transistor 532 is connected to the output terminal 560 of the amplifier 530, and the drain terminal 554 of the transistor 532 receives a rectified voltage 501 (e.g., a rectified voltage $V_{bulk}$). As an example, the terminal 564 of the resistor 534 is connected to an anode of the one or more LEDs 690, and a cathode of the one or more LEDs 690 is biased to the ground voltage of the system (e.g., zero volt). For example, the terminal 564 of the resistor 534 and the anode of the one or more LEDs 690 are biased to the ground voltage of the chip (e.g., the floating ground). As an example, the ground voltage of the chip (e.g., the floating ground) is different from the ground voltage of the system (e.g., zero volt).

According to certain embodiments, the resistor 540 (e.g., the resistor R2) includes terminals 566 and 568, the resistor 542 (e.g., the resistor R3) includes terminals 570 and 572, and the comparator 544 (e.g., the comparator U2) includes an input terminal 574 (e.g., a non-inverting terminal), an input terminal 576 (e.g., an inverting terminal), and an output terminal 578. In some examples, the terminal 566 of the resistor 540 is connected to the drain terminal 554 of the transistor 532, and the terminal 572 of the resistor 542 is biased to a ground voltage of the chip (e.g., a floating ground). For example, the ground voltage of the chip (e.g., the floating ground) is different from the ground voltage of the system (e.g., zero volt). As an example, the terminal 568 of the resistor 540 and the terminal 570 of the resistor 542 are connected at a node 580 (e.g., a node DS), and the node 580 (e.g., the node DS) is connected to the input terminal 574 of the comparator 544. For example, the input terminal 574 of the comparator 544 is configured to detect a change of a voltage 533 of the drain terminal 554 of the transistor 532. As an example, the voltage 533 of the drain terminal 554 of the transistor 532 is equal to the rectified voltage 501 (e.g., the rectified voltage $V_{bulk}$).

According to some embodiments, the input terminal 574 (e.g., the positive terminal) of the comparator 544 receives a voltage 575 of the node 580 (e.g., the node DS), which is connected to the terminal 568 of the resistor 540 and the terminal 570 of the resistor 542. For example, the voltage 575 is directly proportional to the voltage 533 of the drain terminal 554 of the transistor 532. As an example, the input terminal 576 (e.g., the negative terminal) of the comparator 544 receives a threshold voltage 577 (e.g., a threshold voltage $V_{th}$).

In certain embodiments, the comparator 544 compares the voltage 575 and the threshold voltage 577 and generates a control signal 579 (e.g., a control signal en). For example, if the voltage 575 is larger than the threshold voltage 577, the control signal 579 is at a logic high level. As an example, if the voltage 575 is smaller than the threshold voltage 577, the control signal 579 is at a logic low level. In some embodiments, the comparator 544 outputs the control signal 579 at the output terminal 578, and sends the control signal 579 to the switch 546 (e.g., the switch SW1) of the constant current circuit 510.

In some embodiments, the switch 546 includes terminals 582 and 584. For example, the terminal 582 is connected to the output terminal 560 of the amplifier 530, and the terminal 584 is biased to the ground voltage of the chip (e.g., the floating ground). For example, the ground voltage of the chip (e.g., the floating ground) is different from the ground voltage of the system (e.g., zero volt). As an example, the switch 546 receives the control signal 579. In certain examples, if the control signal 579 is at the logic high level, the switch 546 is open. For example, if the switch 546 is open, the constant current circuit 510 is enabled. As an example, if the switch 546 is open, a voltage 503 (e.g., a voltage Gate) of the gate terminal 552 of the transistor 532 is generated by the amplifier 530 (e.g., the error amplifier U1). In some examples, if the control signal 579 is at the logic low level, the switch 546 is closed. As an example, if the switch 546 is closed, the constant current circuit 510 is disabled. For example, if the switch 546 is closed, the voltage 503 of the gate terminal 552 of the transistor 532 is biased to the ground voltage of the chip (e.g., the floating ground). As an example, the ground voltage of the chip (e.g., the floating ground) is different from the ground voltage of the system (e.g., zero volt).

According to some embodiments, if the voltage 575 is smaller than the threshold voltage 577, the constant current circuit 510 is disabled by the control signal 579. For example, if the voltage 575 is smaller than the threshold voltage 577, the voltage 533 of the drain terminal 554 of the transistor 532 is too low for the LED lighting system 600 to provide a constant current to the one or more LEDs 690. As an example, if the constant current circuit 510 is disabled, the current 505 (e.g., the LED current $I_{led}$) that flows through the one or more LEDs 690 is equal to zero in magnitude. For example, if the voltage 575 is smaller than the threshold voltage 577, the constant current circuit 510 does not allow the current 505 (e.g., the LED current $I_{led}$) with a magnitude larger than zero to flow through the one or more LEDs 690.

According to certain embodiments, if the voltage 575 is larger than the threshold voltage 577, the constant current circuit 510 is enabled by the control signal 579. As an example, if the voltage 575 is larger than the threshold voltage 577, the voltage 533 of the drain terminal 554 of the transistor 532 is high enough for the LED lighting system 600 to provide a constant current to the one or more LEDs 690. For example, if the voltage 575 is larger than the threshold voltage 577, the voltage 533 of the drain terminal 554 of the transistor 532 is higher than the minimum voltage value that is needed for the LED lighting system 600 to provide a constant current to the one or more LEDs 690. As an example, if the constant current circuit 510 is enabled, the current 505 that flows through the one or more LEDs 690 is equal to a constant that is larger than zero in magnitude. For example, if the voltage 575 is larger than the threshold voltage 577, the constant current circuit 510 allows the current 505 (e.g., the LED current $I_{led}$) with a magnitude larger than zero to flow through the one or more LEDs 690.

As shown in FIG. 5, the amplifier 530 includes the input terminal 556 (e.g., a non-inverting terminal), the input terminal 558 (e.g., an inverting terminal), and the output terminal 560, according to one embodiment. In some examples, the input terminal 556 (e.g., the positive terminal) receives a reference voltage 557 (e.g., a reference voltage $V_{ref}$). In certain examples, the input terminal 558 (e.g., the negative terminal) is connected to the source terminal 550 of the transistor 532 and the terminal 562 of the resistor 534, and receives a voltage 559 (e.g., a voltage $V_{sense}$). For example, the terminal 564 of the resistor 534 is connected to the anode of the one or more LEDs 690, and the voltage 559 at the terminal 562 of the resistor 534 corresponds to the current 505 that flows through the one or more LEDs 690. As an example, if the switch 546 is open, the amplifier 530 (e.g., the error amplifier U1) generates the voltage 503 based at least in part on the reference voltage 557 (e.g., the reference voltage $V_{ref}$) and the voltage 559 (e.g., the voltage $V_{sense}$), and outputs the voltage 503 at the output terminal 560. For example, the voltage 503 is received by the gate terminal 552 of the transistor 532.

In some embodiments, after the constant current circuit 510 becomes enabled by the control signal 579, the voltage 503 of the gate terminal 552 generated by the amplifier 530 (e.g., the error amplifier U1) slowly increases from the ground voltage of the chip (e.g., the floating ground) to a desired voltage value, and the current 505 that flows through the one or more LEDs 690 also slowly increases from zero to a desired current value. For example, the voltage 503 slowly increases from the ground voltage of the chip (e.g., the floating ground) to the desired voltage value without overshoot and/or oscillation. As an example, the current 505 slowly increases from zero to the desired current value without overshoot and/or oscillation.

In certain embodiments, as shown in FIG. 5, the transistor 532 (e.g., the transistor M1 for power regulation) is a field effect transistor (e.g., a metal-oxide-semiconductor field effect transistor (MOSFET)). For example, the transistor 532 is an insulated gate bipolar transistor (IGBT). As an example, the transistor 532 is a bipolar junction transistor. In some examples, the system controller 600 includes more components or less components. In certain examples, the value of the reference voltage 557 (e.g., the reference voltage $V_{ref}$) and/or the value of the threshold voltage 577 (e.g., the threshold voltage $V_{th}$) can be set as desired by those skilled in the art.

According to certain embodiments, at time $t_{21}$, the TRIAC dimmer 590 stops clipping the AC input voltage (e.g., VAC), and the voltage 575 of the node 580 (e.g., the node DS) starts to increase but remains smaller than the threshold voltage 577 (e.g., the threshold voltage $V_{th}$). For example, at time $t_{21}$, the voltage 575 remains smaller than the threshold voltage 577, the control signal 579 (e.g., the control signal en) remains at the logic low level, and the voltage 503 (e.g., the voltage Gate) of the gate terminal 552 of the transistor 532 remains biased to the ground voltage of the chip (e.g., the floating ground). As an example, at time $t_{21}$, the constant current circuit 510 remains disabled by the control signal 579, and the current 505 (e.g., the LED current $I_{led}$) remains equal to zero in magnitude.

According to some embodiments, from time $t_{21}$ to time $t_{22}$, the voltage 575 of the node 580 (e.g., the node DS) increases but remains smaller than the threshold voltage 577 (e.g., the threshold voltage $V_{th}$). For example, from time $t_{21}$ to time $t_{22}$, the voltage 575 remains smaller than the threshold voltage 577, the control signal 579 (e.g., the control signal en) remains at the logic low level, and the voltage 503 (e.g., the voltage Gate) of the gate terminal 552 of the transistor 532 remains biased to the ground voltage of the chip (e.g., the floating ground). As an example, from time $t_{21}$ to time $t_{22}$, the constant current circuit 510 remains disabled by the control signal 579, and the current 505 (e.g., the LED current $I_{led}$) remains equal to zero in magnitude.

According to certain embodiments, at time $t_{22}$, the voltage 575 of the node 580 (e.g., the node DS) becomes larger than the threshold voltage 577 (e.g., the threshold voltage $V_{th}$). For example, at time $t_{22}$, the voltage 575 becomes larger than the threshold voltage 577, the control signal 579 (e.g., the control signal en) changes from the logic low level to the logic high level, and the voltage 503 (e.g., the voltage Gate) of the gate terminal 552 of the transistor 532 starts to increase from the ground voltage of the chip (e.g., the floating ground). As an example, at time $t_{22}$, the constant current circuit 510 becomes enabled by the control signal 579, and the current 505 (e.g., the LED current $I_{led}$) starts to increase from zero in magnitude.

According to some embodiments, from time $t_{22}$ to time $t_{23}$, the voltage 575 of the node 580 (e.g., the node DS) remains larger than the threshold voltage 577 (e.g., the threshold voltage $V_{th}$). In certain examples, from time $t_{22}$ to time $t_{23}$, the voltage 575 remains larger than the threshold voltage 577, the control signal 579 (e.g., the control signal en) remains at the logic high level, and the voltage 503 (e.g., the voltage Gate) of the gate terminal 552 of the transistor 532 increases from the ground voltage of the chip (e.g., the floating ground) to a voltage level $V_{21}$. For example, the voltage level $V_{21}$ is higher than a threshold voltage of the gate terminal for turning on the transistor 532 (e.g., the transistor M1 for power regulation). In some examples, from time $t_{22}$ to time $t_{23}$, the constant current circuit 510 remains enabled by the control signal 579, and the current 505 (e.g., the LED current $I_{led}$) increases from zero to a current level 121. As an example, the current level 121 is a predetermined magnitude.

According to certain embodiments, at time $t_{23}$, the voltage 575 of the node 580 (e.g., the node DS) remains larger than the threshold voltage 577 (e.g., the threshold voltage $V_{th}$). In certain examples, at time $t_{23}$, the voltage 575 remains larger than the threshold voltage 577, the control signal 579 (e.g., the control signal en) remains at the logic high level, and the voltage 503 (e.g., the voltage Gate) of the gate terminal 552 of the transistor 532 reaches the voltage level $V_{21}$. In some examples, at time $t_{23}$, the constant current circuit 510 remains enabled by the control signal 579, and the current 505 (e.g., the LED current $I_{led}$) reaches the current level 121.

According to some embodiments, from time $t_{23}$ to time $t_{24}$, the voltage 575 of the node 580 (e.g., the node DS) remains larger than the threshold voltage 577 (e.g., the threshold voltage $V_{th}$). In certain examples, from time $t_{23}$ to time $t_{24}$, the voltage 575 remains larger than the threshold voltage 577, the control signal 579 (e.g., the control signal en) remains at the logic high level, and the voltage 503 (e.g., the voltage Gate) of the gate terminal 552 of the transistor 532 remains constant at the voltage level $V_{21}$. In some examples, from time $t_{23}$ to time $t_{24}$, the constant current circuit 510 remains enabled by the control signal 579, and the current 505 (e.g., the LED current $I_{led}$) remains constant at the current level 121.

According to certain embodiments, at time $t_{24}$, the voltage 575 of the node 580 (e.g., the node DS) becomes smaller than the threshold voltage 577 (e.g., the threshold voltage $V_{th}$). For example, at time $t_{24}$, the voltage 575 becomes smaller than the threshold voltage 577, the control signal 579 (e.g., the control signal en) changes from the logic high level to the logic low level, and the voltage 503 (e.g., the voltage Gate) of the gate terminal 552 of the transistor 532 decreases from the voltage level $V_{21}$ to the ground voltage of the chip (e.g., the floating ground). As an example, at time $t_{24}$, the constant current circuit 510 becomes disabled by the control signal 579, and the current 505 (e.g., the LED current $I_{led}$) decreases from the current level 121 to zero.

According to some embodiments, from time $t_{24}$ to time $t_{25}$, the voltage 575 of the node 580 (e.g., the node DS) remains smaller than the threshold voltage 577 (e.g., the threshold voltage $V_{th}$). For example, from time $t_{24}$ to time $t_{25}$, the voltage 575 remains smaller than the threshold voltage 577, the control signal 579 (e.g., the control signal en) remains at the logic low level, and the voltage 503 (e.g., the voltage Gate) of the gate terminal 552 of the transistor 532 remains at the ground voltage of the chip (e.g., the floating ground). As an example, from time $t_{24}$ to time $t_{25}$, the constant current circuit 510 remains disabled by the control signal 579, and the current 505 (e.g., the LED current $I_{led}$) remains at zero.

In certain embodiments, a system for LED switch control is provided. For example, the system includes a rectifying module configured to rectify an input voltage that has been processed by a TRIAC dimmer and to transmit the rectified voltage to a combination of one or more LEDs, the combination of the one or more LEDs being coupled to a constant current module and an enablement control module. As an example, the system also includes the enablement control module configured to receive a sensing voltage corresponding to the rectified voltage, to compare the sensing voltage with a predetermined threshold voltage, to output an enablement signal at a logic low level if the sensing voltage is lower than the predetermined threshold voltage, and to output the enablement signal at a logic high level if the sensing voltage is higher than the predetermined threshold voltage. As an example, the system also includes the constant current module configured to receive the enablement signal, to allow a current to flow through the combination of the one or more LEDs if the enablement signal is at the logic high level, and to not allow the current to flow through the combination of the one or more LEDs if the enablement signal is at the logic low level.

In some examples, the constant current module includes an amplifier, a transistor for power regulation, and a first resistor, wherein the source of the transistor is coupled to the first resistor, the gate of the transistor is coupled to the output of the amplifier, and the drain of the transistor is coupled to a cathode of the combination of the one or more LEDs. In certain examples, the enablement control module includes a second resistor and a third resistor connected in series, and a comparator, wherein the second resistor and the third resistor are connected to the drain of the transistor at one end and grounded at another end, the non-inverting input of the comparator is connected to a connection point of the first resistor and the second resistor, and the inverting input of the comparator receives the predetermined threshold voltage.

According to certain embodiments, a system (e.g., the system controller 300) for controlling one or more light emitting diodes includes a current regulation circuit (e.g., the constant current circuit 310) coupled to a cathode of one or more light emitting diodes (e.g., the one or more LEDs 490). The one or more light emitting diodes include the cathode and an anode configured to receive a rectified voltage (e.g., the rectified voltage 301). Additionally, the system includes a control circuit (e.g., the control circuit 320) coupled to the cathode of the one or more light emitting diodes. The control circuit is configured to receive a first voltage (e.g., the voltage 333) from the cathode of the one or more light emitting diodes, compare a second voltage (e.g., the voltage 375) and a threshold voltage (e.g., the threshold voltage 377), and generate a control signal (e.g., the control signal 379) based at least in part on the second voltage and the threshold voltage. The second voltage indicates a magnitude of the first voltage. The control circuit is further configured to: if the second voltage is larger than the threshold voltage, generate the control signal at a first logic level; and if the second voltage is smaller than the threshold voltage, generate the control signal at a second logic level. The current regulation circuit is configured to: receive the control signal from the control circuit; allow a current (e.g., the current 305) to flow through the one or more light emitting diodes if the control signal is at the first logic level, the current being larger than zero in magnitude; and not allow the current to flow through the one or more light emitting diodes if the control signal is at the second logic level. For example, the system (e.g., the system controller 300) is implemented according to at least FIG. 3.

As an example, the second voltage is directly proportional to the first voltage in magnitude. For example, the first logic level is a logic high level, and the second logic level is a logic low level. As an example, the current regulation circuit includes: an amplifier (e.g., the amplifier 330) including a first amplifier input terminal (e.g., the input terminal 356), a second amplifier input terminal (e.g., the input terminal 358), and an amplifier output terminal (e.g., the output terminal 360); a transistor (e.g., the transistor 332) including a drain terminal (e.g., the drain terminal 354), a gate terminal (e.g., the gate terminal 352), and a source terminal (e.g., the source terminal 350); and a resistor (e.g., the resistor 334) including a first resistor terminal (e.g., the terminal 362) and a second resistor terminal (e.g., the terminal 364); wherein: the drain terminal of the transistor is coupled to the cathode of the one or more light emitting diodes; the gate terminal of the transistor is coupled to the amplifier output terminal of the amplifier; and the source terminal of the transistor is coupled to the first resistor terminal of the resistor and the second amplifier input terminal of the amplifier. For example, the first amplifier input terminal of the amplifier is configured to receive a reference voltage (e.g., the reference voltage 357). As an example, the second resistor terminal of the resistor is configured to receive a ground voltage (e.g., zero volt).

For example, the control circuit includes: a first resistor (e.g., the resistor 340) including a first resistor terminal (e.g., the terminal 366) and a second resistor terminal (e.g., the terminal 368); a second resistor (e.g., the resistor 342) including a third resistor terminal (e.g., the terminal 370) and a fourth resistor terminal (e.g., the terminal 372), the third resistor terminal being connected to the second resistor terminal; and a comparator (e.g., the comparator 344) including a first comparator input terminal (e.g., the input terminal 374), a second comparator input terminal (e.g., the input terminal 376), and a comparator output terminal (e.g., the output terminal 378); wherein: the first resistor terminal is coupled to the cathode of the one or more light emitting diodes and configured to receive the first voltage; and the fourth resistor terminal is configured to receive a ground voltage (e.g., zero volt); wherein: the first comparator input terminal is coupled to the second resistor terminal and the third resistor terminal and configured to receive the second voltage; the second comparator input terminal is configured to receive a threshold voltage (e.g., the threshold voltage 377); and the comparator output terminal is configured to output the control signal based at least in part on the second voltage and the threshold voltage.

As an example, the current regulation circuit includes: an amplifier (e.g., the amplifier 330) including a first amplifier input terminal (e.g., the input terminal 356), a second amplifier input terminal (e.g., the input terminal 358), and an amplifier output terminal (e.g., the output terminal 360); a transistor (e.g., the transistor 332) including a drain terminal (e.g., the drain terminal 354), a gate terminal (e.g., the gate terminal 352), and a source terminal (e.g., the source terminal 350); and a third resistor (e.g., the resistor 334) including a fifth resistor terminal (e.g., the terminal 362) and a sixth resistor terminal (e.g., the terminal 364); wherein: the drain terminal of the transistor is coupled to the cathode of the one or more light emitting diodes; the gate terminal of the transistor is coupled to the amplifier output terminal of the amplifier; and the source terminal of the transistor is coupled to the fifth resistor terminal of the third resistor and the second amplifier input terminal of the amplifier. For example, the sixth resistor terminal is configured to receive the ground voltage.

As an example, the control circuit further includes: a switch (e.g., the switch 346) including a first switch terminal (e.g., the terminal 382) and a second switch terminal (e.g., the terminal 384); wherein: the first switch terminal is connected to the amplifier output terminal (e.g., the output terminal 360) of an amplifier (e.g., the amplifier 330); and the second switch terminal is configured to receive the ground voltage. For example, the control circuit is further configured to: open the switch if the control signal is at the first logic level; and close the switch if the control signal is at the second logic level.

In some examples, from a first time (e.g., time $t_{in}$) to a second time (e.g., time $t_{12}$), the second voltage (e.g., the voltage 375) increases but remains smaller than the threshold voltage (e.g., the threshold voltage 377), and the control signal remains at the second logic level; at the second time, the second voltage (e.g., the voltage 375) becomes larger than the threshold voltage (e.g., the threshold voltage 377), and the control signal changes from the second logic level to the first logic level; from the second time (e.g., time $t_{12}$) to a third time (e.g., time $t_{13}$), the second voltage remains larger than the threshold voltage, and the control signal remains at the first logic level; at the third time (e.g., time $t_{13}$), the second voltage remains larger than the threshold voltage, the control signal remains at the first logic level, and the current (e.g., the current 305) reaches a predetermined current level (e.g., the current level $I_{11}$); from the third time (e.g., time $t_{13}$) to a fourth time (e.g., time $t_{14}$), the second voltage remains larger than the threshold voltage, the control signal remains at the first logic level, and the current (e.g., the current 305) remains constant at the predetermined current level (e.g., the current level $I_{11}$); at the fourth time (e.g., time $t_{14}$), the second voltage becomes smaller than the threshold voltage, and the control signal changes from the first logic level to the second voltage level; and from the fourth time (e.g., time $t_{14}$) to a fifth time (e.g., time $t_{15}$), the second voltage remains smaller than the threshold voltage, and the control signal remains at the second voltage level.

According to some embodiments, a system (e.g., the system controller 500) for controlling one or more light emitting diodes includes a current regulation circuit (e.g., the constant current circuit 510) configured to receive a rectified voltage (e.g., the rectified voltage 501) and coupled to an anode of one or more light emitting diodes (e.g., the one or more LEDs 690). The one or more light emitting diodes include the anode and a cathode. Additionally, the system includes a control circuit (e.g., the control circuit 520) configured to receive the rectified voltage (e.g., the rectified voltage 501). The control circuit is configured to: compare an input voltage (e.g., the voltage 575) and a threshold voltage (e.g., the threshold voltage 577), the input voltage indicating a magnitude of the rectified voltage; and generate a control signal (e.g., the control signal 579) based at least in part on the input voltage and the threshold voltage. The control circuit is further configured to: if the input voltage is larger than the threshold voltage, generate the control signal at a first logic level; and if the input voltage is smaller than the threshold voltage, generate the control signal at a second logic level. The current regulation circuit is configured to: receive the control signal from the control circuit; allow a current (e.g., the current 505) to flow through the one or more light emitting diodes if the control signal is at the first logic level, the current being larger than zero in magnitude; and not allow the current to flow through the one or more light emitting diodes if the control signal is at the second logic level. For example, the system (e.g., the system controller 500) is implemented according to at least FIG. 5.

As an example, the input voltage is directly proportional to the rectified voltage in magnitude. For example, the first logic level is a logic high level; and the second logic level is a logic low level. As an example, the current regulation circuit includes: an amplifier (e.g., the amplifier 530) including a first amplifier input terminal (e.g., the input terminal 556), a second amplifier input terminal (e.g., the input terminal 558), and an amplifier output terminal (e.g., the output terminal 560); a transistor (e.g., the transistor 532) including a drain terminal (e.g., the drain terminal 554), a gate terminal (e.g., the gate terminal 552), and a source terminal (e.g., the source terminal 550); and a resistor (e.g., the resistor 534) including a first resistor terminal (e.g., the terminal 562) and a second resistor terminal (e.g., the terminal 564); wherein: the drain terminal of the transistor is configured to receive the rectified voltage (e.g., the rectified voltage 501); the gate terminal of the transistor is coupled to the amplifier output terminal of the amplifier; and the source terminal of the transistor is coupled to the anode of the one or more light emitting diodes (e.g., the one or more LEDs 690). For example, the first amplifier input terminal of the amplifier is configured to receive a reference voltage (e.g., the reference voltage 557). As an example, the cathode of the one or more light emitting diodes is configured to receive a ground voltage (e.g., zero volt).

For example, the control circuit includes: a first resistor (e.g., the resistor 540) including a first resistor terminal (e.g., the terminal 566) and a second resistor terminal (e.g., the terminal 568); a second resistor (e.g., the resistor 542) including a third resistor terminal (e.g., the terminal 570) and a fourth resistor terminal (e.g., the terminal 572), the third resistor terminal being connected to the second resistor terminal; and a comparator (e.g., the comparator 544) including a first comparator input terminal (e.g., the input terminal 574), a second comparator input terminal (e.g., the input terminal 576), and a comparator output terminal (e.g., the output terminal 578); wherein: the first resistor terminal is configured to receive the rectified voltage (e.g., the rectified voltage 501); and the fourth resistor terminal is configured to receive a ground voltage (e.g., the floating ground); wherein: the first comparator input terminal is coupled to the second resistor terminal and the third resistor terminal and configured to receive the input voltage; the second comparator input terminal is configured to receive a threshold voltage (e.g., the threshold voltage 577); and the comparator output terminal is configured to output the control signal based at least in part on the input voltage and the threshold voltage.

As an example, the current regulation circuit includes: an amplifier (e.g., the amplifier 530) including a first amplifier input terminal (e.g., the input terminal 556), a second amplifier input terminal (e.g., the input terminal 558), and an amplifier output terminal (e.g., the output terminal 560); a transistor (e.g., the transistor 532) including a drain terminal (e.g., the drain terminal 554), a gate terminal (e.g., the gate terminal 552), and a source terminal (e.g., the source terminal 550); and a third resistor (e.g., the resistor 534) including a fifth resistor terminal (e.g., the terminal 562) and a sixth resistor terminal (e.g., the terminal 564); wherein: the drain terminal of the transistor is configured to receive the rectified voltage (e.g., the rectified voltage 501); the gate terminal of the transistor is coupled to the amplifier output terminal of the amplifier; and the source terminal of the transistor is coupled to the fifth resistor terminal of the third resistor and the second amplifier input terminal of the amplifier. For example, the sixth resistor terminal is coupled to the anode of the one or more light emitting diodes.

As an example, the control circuit further includes: a switch (e.g., the switch 546) including a first switch terminal (e.g., the terminal 582) and a second switch terminal (e.g., the terminal 584); wherein: the first switch terminal is connected to the amplifier output terminal (e.g., the output terminal 560) of an amplifier (e.g., the amplifier 530); and the second switch terminal is configured to receive the ground voltage. For example, the control circuit is further configured to: open the switch if the control signal is at the first logic level; and close the switch if the control signal is at the second logic level.

In certain examples, from a first time (e.g., time $t_{21}$) to a second time (e.g., time $t_{22}$), the second voltage (e.g., the voltage 575) increases but remains smaller than the threshold voltage (e.g., the threshold voltage 577), and the control signal remains at the second logic level; at the second time, the second voltage (e.g., the voltage 575) becomes larger than the threshold voltage (e.g., the threshold voltage 577), and the control signal changes from the second logic level to the first logic level; from the second time (e.g., time $t_{22}$) to a third time (e.g., time $t_{23}$), the second voltage remains larger than the threshold voltage, and the control signal remains at the first logic level; at the third time (e.g., time $t_{23}$), the second voltage remains larger than the threshold voltage, the control signal remains at the first logic level, and the current (e.g., the current 505) reaches a predetermined current level (e.g., the current level $I_{21}$); from the third time (e.g., time $t_{23}$) to a fourth time (e.g., time $t_{24}$), the second voltage remains larger than the threshold voltage, the control signal remains at the first logic level, and the current (e.g., the current 505) remains constant at the predetermined current level (e.g., the current level $I_{21}$); at the fourth time (e.g., time $t_{24}$), the second voltage becomes smaller than the threshold voltage, and the control signal changes from the first logic level to the second voltage level; and from the fourth time (e.g., time $t_{24}$) to a fifth time (e.g., time $t_{25}$), the second voltage remains smaller than the threshold voltage, and the control signal remains at the second voltage level.

According to certain embodiments, a method for controlling one or more light emitting diodes includes: receiving a first voltage (e.g., the voltage 333) from a cathode of one or more light emitting diodes by a control circuit (e.g., the control circuit 320) coupled to the cathode of the one or more light emitting diodes, the one or more light emitting diodes including the cathode and an anode configured to receive a rectified voltage (e.g., the rectified voltage 301); comparing a second voltage (e.g., the voltage 375) and a threshold voltage (e.g., the threshold voltage 377), the second voltage indicating a magnitude of the first voltage; generating a control signal (e.g., the control signal 379) at a first logic level if the second voltage is larger than the threshold voltage; generating the control signal at a second logic level if the second voltage is smaller than the threshold voltage; receiving the control signal from the control circuit by a current regulation circuit (e.g., the constant current circuit 310) coupled to the cathode of one or more light emitting diodes (e.g., the one or more LEDs 490); allowing a current (e.g., the current 305) to flow through the one or more light emitting diodes if the control signal is at the first logic level, the current being larger than zero in magnitude; and not allowing the current to flow through the one or more light emitting diodes if the control signal is at the second logic level. For example, the method is implemented according to at least FIG. 3.

According to some embodiments, a method for controlling one or more light emitting diodes includes: receiving a rectified voltage (e.g., the rectified voltage 501) by a control circuit (e.g., the control circuit 520); comparing an input voltage (e.g., the voltage 575) and a threshold voltage (e.g., the threshold voltage 577), the input voltage indicating a magnitude of the rectified voltage; if the input voltage is larger than the threshold voltage, generating a control signal (e.g., the control signal 579) at a first logic level; if the input voltage is smaller than the threshold voltage, generating the control signal at a second logic level; receiving the control signal from the control circuit by a current regulation circuit (e.g., the constant current circuit 510) configured to receive the rectified voltage (e.g., the rectified voltage 501) and coupled to an anode of one or more light emitting diodes (e.g., the one or more LEDs 690), the one or more light emitting diodes including the anode and a cathode; allowing a current (e.g., the current 505) to flow through the one or more light emitting diodes if the control signal is at the first logic level, the current being larger than zero in magnitude; and not allowing the current to flow through the one or more light emitting diodes if the control signal is at the second logic level. For example, the method is implemented according to at least FIG. 5.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for controlling one or more light emitting diodes, the system comprising:
a current regulation circuit coupled directly to a rectifier to receive a rectified voltage and coupled to an anode of one or more light emitting diodes, the one or more light emitting diodes including the anode and a cathode; and
a control circuit configured to receive the rectified voltage;
wherein the control circuit is configured to:
compare an input voltage and a threshold voltage, the input voltage indicating a magnitude of the rectified voltage; and
generate a control signal based at least in part on the input voltage and the threshold voltage;
wherein the control circuit is further configured to:
if the input voltage is larger than the threshold voltage, generate the control signal at a first logic level; and
if the input voltage is smaller than the threshold voltage, generate the control signal at a second logic level;
wherein the current regulation circuit is configured to:
receive the control signal from the control circuit;
allow a current to flow through the one or more light emitting diodes if the control signal is at the first logic level, the current being larger than zero in magnitude; and
not allow the current to flow through the one or more light emitting diodes if the control signal is at the second logic level.

2. The system of claim 1 wherein the input voltage is directly proportional to the rectified voltage in magnitude.

3. The system of claim 1 wherein:
the first logic level is a logic high level; and
the second logic level is a logic low level.

4. The system of claim 1 wherein the control circuit includes:
a first resistor including a first resistor terminal and a second resistor terminal;
a second resistor including a third resistor terminal and a fourth resistor terminal, the third resistor terminal being connected to the second resistor terminal; and
a comparator including a first comparator input terminal, a second comparator input terminal, and a comparator output terminal;
wherein:
the first resistor terminal is configured to receive the rectified voltage; and
the fourth resistor terminal is configured to receive a ground voltage;
wherein:
the first comparator input terminal is coupled to the second resistor terminal and the third resistor terminal and configured to receive the input voltage;
the second comparator input terminal is configured to receive the threshold voltage; and
the comparator output terminal is configured to output the control signal based at least in part on the input voltage and the threshold voltage.

5. The system of claim 4 wherein the current regulation circuit includes:
an amplifier including a first amplifier input terminal, a second amplifier input terminal, and an amplifier output terminal;
a transistor including a drain terminal, a gate terminal, and a source terminal; and
a third resistor including a fifth resistor terminal and a sixth resistor terminal;
wherein:
the drain terminal of the transistor is configured to receive the rectified voltage;
the gate terminal of the transistor is coupled to the amplifier output terminal of the amplifier; and
the source terminal of the transistor is coupled to the fifth resistor terminal of the third resistor and the second amplifier input terminal of the amplifier.

6. The system of claim 5 wherein the sixth resistor terminal is coupled to the anode of the one or more light emitting diodes.

7. The system of claim 5 wherein the control circuit further includes:
a switch including a first switch terminal and a second switch terminal;
wherein:
the first switch terminal is connected to the amplifier output terminal of the amplifier; and
the second switch terminal is configured to receive the ground voltage.

8. The system of claim 7 wherein the control circuit is further configured to:

open the switch if the control signal is at the first logic level; and close the switch if the control signal is at the second logic level.

9. A method for controlling one or more light emitting diodes, the method comprising:

receiving a rectified voltage by a control circuit coupled directly to a rectifier;

comparing an input voltage and a threshold voltage, the input voltage indicating a magnitude of the rectified voltage;

if the input voltage is larger than the threshold voltage, generating a control signal at a first logic level;

if the input voltage is smaller than the threshold voltage, generating the control signal at a second logic level;

receiving the control signal from the control circuit by a current regulation circuit configured to receive the rectified voltage and coupled to an anode of one or more light emitting diodes, the one or more light emitting diodes including the anode and a cathode;

allowing a current to flow through the one or more light emitting diodes if the control signal is at the first logic level, the current being larger than zero in magnitude; and not allowing the current to flow through the one or more light emitting diodes if the control signal is at the second logic level.

10. A system for controlling one or more light emitting diodes, the system comprising:

a current regulation circuit configured to receive a rectified voltage and coupled to an anode of one or more light emitting diodes, the one or more light emitting diodes including the anode and a cathode; and a control circuit configured to receive the rectified voltage and generate a control signal based at least in part on the rectified voltage;

wherein the current regulation circuit is configured to:
 receive the control signal from the control circuit;
 allow a current to flow through the one or more light emitting diodes if the control signal is at a first logic level, the current being larger than zero in magnitude; and
 not allow the current to flow through the one or more light emitting diodes if the control signal is at a second logic level;

wherein the current regulation circuit includes:
 an amplifier including a first amplifier input terminal, a second amplifier input terminal, and an amplifier output terminal; and
 a transistor including a drain terminal, a gate terminal, and a source terminal;

wherein:
 the drain terminal of the transistor is configured to receive the rectified voltage;
 the gate terminal of the transistor is coupled to the amplifier output terminal of the amplifier; and
 the source terminal of the transistor is coupled to the anode of the one or more light emitting diodes.

* * * * *